US012603450B2

(12) United States Patent
Mongold et al.

(10) Patent No.: US 12,603,450 B2
(45) **Date of Patent: *Apr. 14, 2026**

(54) CABLE CONNECTOR SYSTEMS

(71) Applicant: Samtec, Inc., New Albany, IN (US)

(72) Inventors: John A. Mongold, New Albany, IN (US); Jonathan E. Buck, New Albany, IN (US); Jignesh H. Shah, New Albany, IN (US); Chadrick P. Faith, New Albany, IN (US); Randall E. Musser, New Albany, IN (US); Jean Karlo Williams Barnet, New Albany, IN (US); Norman S. McMorrow, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,033

(22) Filed: May 22, 2024

(65) Prior Publication Data

US 2024/0313451 A1 Sep. 19, 2024

Related U.S. Application Data

(63) Continuation of application No. 18/096,605, filed on Jan. 13, 2023, now Pat. No. 12,100,908, which is a continuation of application No. 17/266,937, filed as application No. PCT/US2019/055139 on Oct. 8, 2019, now Pat. No. 11,588,262.

(60) Provisional application No. 62/840,731, filed on Apr. 30, 2019, provisional application No. 62/813,102, filed on Mar. 3, 2019, provisional application No. 62/704,052, filed on Jan. 28, 2019, provisional application No. 62/704,025, filed on Oct. 9, 2018.

(30) Foreign Application Priority Data

Jul. 11, 2019 (WO) ................ PCT/US2019/041356

(51) Int. Cl.
*H01R 12/79* (2011.01)
*H01R 13/518* (2006.01)

(52) U.S. Cl.
CPC ........... *H01R 12/79* (2013.01); *H01R 13/518* (2013.01)

(58) Field of Classification Search
CPC .... H01R 9/096; H01R 23/7073; H01R 12/79; H01R 13/518
USPC .................................. 439/74, 65, 541.5, 638
See application file for complete search history.

(56) References Cited

U.S. PATENT DOCUMENTS 5,967,846 A * 10/1999 Davis ................. H01R 13/6582 439/607.17
11,588,262 B2 * 2/2023 Mongold ........... H01R 13/6587
12,100,908 B2 * 9/2024 Mongold ............. H01R 13/518

OTHER PUBLICATIONS

Mongold et al., "Cable Connector Systems", U.S. Appl. No. 18/096,605, filed Jan. 13, 2023.

* cited by examiner

*Primary Examiner* — Gary F Paumen
(74) *Attorney, Agent, or Firm* — Keating & Bennett, LLP

(57) ABSTRACT

A cable connector system can include a board connector that attaches to a die package, a cable connector that attaches to the board connector, and a 1RU panel I/O connector attached to the cable connector.

24 Claims, 35 Drawing Sheets

CABLE CONNECTOR SYSTEMS

CROSS REFERENCE TO RELATED APPLICATIONS

This application claims the benefit of U.S. Patent Application No. 62/704,025, filed on Oct. 9, 2018; U.S. Patent Application No. 62/704,052, filed on Jan. 28, 2019; U.S. Patent Application No. 62/813,102, filed on Mar. 3, 2019; U.S. Patent Application No. 62/840,731, filed Apr. 30, 2019; and PCT Application No. PCT/US2019/041356, filed Jul. 11, 2019, all of which are incorporated by reference in their entirety for all purposes as if fully set forth herein.

BACKGROUND OF THE INVENTION

1. Field of the Invention

The present invention relates to connector systems. More specifically, the present invention relates to a connector system that allows cable connectors to be connected to a substrate in a stacked configuration.

2. Description of the Related Art

Cable connector systems that can include differential signal pairs or optical cables that electrically or optically connect an application-specific integrated circuit (ASIC) and a panel are known. A problem with known cable connector systems is providing higher density and higher terabyte throughput between an ASIC and a front panel of a rack-mountable equipment enclosing the ASIC.

SUMMARY OF THE INVENTION

To overcome the problems described above, preferred embodiments of the present invention provide cable connector systems that allow cable connectors to be connected to a board connector in a stacked or nested configuration, while reducing the footprint and stack height required by the board connector. For example, embodiments of the present invention can be used in groups of connectors positioned on one or both opposed surfaces of a die package substrate or on one or both opposed sides of a second substrate that includes a die package and is attached to a host substrate. The embodiments of the present invention can be used to collectively transmit at least 50 terabytes of data with frequency domain crosstalk of −40 dB or better on a standard 70-mm-by-70-mm die package, a 75-mm-by-75-mm die package, an 85-mm-by-85-mm die package, a 120-mm-by-120-mm die package, a 150-mm-by-150-mm die package, or other sized die packages. Embodiments of the present invention can have a height, measured from a mounting surface of the substrate to a top surface of any one of the connectors described herein of about 1.5 mm to about 7 mm.

A board connector can include a housing. The housing can include a first board connector mating interface surface, a first slot defined by the first board connector mating interface surface, a second slot vertically stacked over the first slot, and a first housing wall that partially defines both the first slot and the second slot. A first leadframe assembly can be positioned in the first slot. The first leadframe assembly can include a first signal conductor that can define a first mating end and a second signal conductor that can define a second mating end. A second leadframe assembly can be positioned in the second slot. The second leadframe assembly can include a third signal conductor that defines a third mating end and a fourth signal conductor that defines a fourth mating end. The first mating end and the second mating end can each be positioned closer to the first board connector mating interface surface than the third mating end and the fourth mating end. A first housing wall can extend over the first mating end, the second mating end, the third mating end, and the fourth mating end.

The first slot can be partially defined by the first housing wall, a first wall, and an opposed third wall. The first wall and the opposed third wall can be evenly spaced from a longitudinal centerline that is positioned between the first wall and the opposed third wall. The longitudinal centerline can also be parallel to both the first wall and the opposed third wall.

The second slot can be partially defined by the first housing wall, the first wall, and the opposed third wall, and the first wall and the opposed third wall can each be unevenly spaced from the longitudinal centerline. Alternatively, the second slot can be partially defined by the first housing wall, the first wall, and the opposed third wall, and the first wall and the opposed third wall are evenly spaced from the longitudinal centerline.

The housing can include a third slot vertically stacked over the second slot, a second housing wall that partially defines both the second slot and the third slot, and a third leadframe assembly positioned in the third slot. The third leadframe assembly can include a fifth signal conductor with a fifth mating end and a sixth signal conductor with a sixth mating end. The fifth mating end and the sixth mating end can each be positioned farther from the first board connector mating interface surface than the first mating end, the second mating end, the third mating end, and the fourth mating end.

The third slot can be partially defined by the second housing wall, a first wall, and an opposed third wall, and the first wall and the opposed third wall are unevenly spaced from the longitudinal centerline. Alternatively, the second slot can be partially defined by the second housing wall, a first wall, and an opposed third wall, and the first wall and the opposed third wall can be evenly spaced from the longitudinal centerline.

The board connector housing can further include a fourth slot vertically stacked over the third slot, a third housing wall that partially defines both the third slot and the fourth slot, and a fourth leadframe assembly positioned in the fourth slot. A fourth leadframe assembly can include a seventh signal conductor with a seventh mating end and an eighth signal conductor with an eighth mating end. The seventh mating end and the eighth mating end can each be positioned farther from the first board connector mating interface surface than the first mating end, the second mating end, the third mating end, the fourth mating end, the fifth mating end, and the sixth mating end.

The fourth slot can be partially defined by the third housing wall, a first wall, and an opposed third wall, and the first wall and the opposed third wall can be unevenly spaced from the longitudinal centerline. Alternatively, the fourth slot can be partially defined by the third housing wall, a first wall, and an opposed third wall, and the first wall and the opposed third wall can be evenly spaced from the longitudinal centerline.

The first slot and the second slot can each have a same width. The first slot and the second slot can each have a same depth. The first slot and the second slot can each have different depths. The first slot and the second slot can each receive an identical cable connector. The first, second, third, and fourth signal conductors can each be receptacle conductors. The housing is configured to overhang an edge of a mounting substrate. The housing can have a height of approximately 1.7 mm to approximately 4 mm or approximately 4 mm to approximately 7 mm or approximately 5 mm to approximately 8 mm, or approximately 1.7 mm to approximately 7 mm. The first slot, the second slot, and the third slot can each have a same width. The second slot and the third slot can each have a same width. The first slot, the second slot, and the third slot can each have the same depth. The second slot and the third slot can each have the same depth. The first slot, the second slot, the third slot, and the fourth slot can each have the same width. The third slot and the fourth slot can each have the same width. The first slot, the second slot, the third slot, and the fourth slot can each have the same depth. The third slot and the fourth slot can each have the same depth.

A cable connector can include a cable connector shield. The cable connector shield can include a single sheet of electrically conductive material with a shield arm and a hole. The shield arm can bend back over itself and extend into the hole. The cable connector can mate with a mating connector. The shield arm can be configured to make electrical connection with a mating connector shield. The cable connector can include an insert that includes cable connector signal conductors. Cables can be connected to the cable connector signal conductors. The cable connector can be approximately 1 mm in height.

An electrical connector with differential signal pairs and a unitary connector shield can be provided. The connector shield can include a first connector shield surface, a second connector shield surface opposed to the first connector shield surface, a hole, and a shield arm. The shield arm can bend back over the first connector shield surface and pass through the hole, the first connector shield surface, and the second connector shield surface, such that the shield arm is configured to contact a mating connector shield of a mating connector when the electrical connector is mated with the mating connector. The electrical connector can be a cable connector.

A panel can be provided. The panel can define a 1RU area and at least two-hundred and fifty-seven 56-GHz differential signal pairs positioned in the 1RU area, or at least two-hundred and eighty-nine 56-GHz differential signal pairs can be positioned in the 1RU area, or at least three hundred 56-GHz differential signal pairs can be positioned in the 1RU area, or at least four hundred 56-GHz differential signal pairs can be positioned in the 1RU area, or at least five hundred 56-GHz differential signal pairs can be positioned in the 1RU area.

A tray can be provided. The tray can include a first airflow zone and a second airflow zone. The first airflow zone and the second airflow zone can each be positioned parallel to each other, can each be positioned immediately adjacent to each other, and can each be serviced by separate fans. Back-to-back, on-board transceivers can be positioned in the first airflow zone. A die can be positioned in the second airflow zone.

Mated electrical right-angle connectors can have a mated stack height greater than zero but less than approximately 5 mm.

A substrate can be provided. The substrate can include a first linear array of pads that can extend along a first pad centerline and can include first and second end pads at opposite ends of the first linear array of pads. A second linear array of pads can extend along a second pad centerline and can include third and fourth end pads at opposite ends of the second linear array of pads. A possible first weld tab land on the substrate can have a first weld tab centerline. A possible second weld tab land on the substrate can have a second weld tab centerline. A first pad centerline can be positioned parallel to the second pad centerline. The first linear array of pads can be offset from the second linear array of pads by more than a row pitch. The first end pad and the third end pad can each be on a same side of the substrate. The second end pad and the fourth end pad can each be on a same side of the substrate opposite to the first end pad and the third end pad. The first weld tab centerline and the second weld tab centerline can each be positioned parallel to each other and perpendicular to the first pad centerline and to the second pad centerline. A first pad distance from a center of the second end pad to the second weld tab centerline can be less than a second pad distance from a center of the third end pad to the first weld tab centerline. A third pad distance between the first end pad in the first linear array of pads to the first weld tab centerline can be greater than the first pad distance. The first pad centerline and the second pad centerline do not intersect the first weld tab land or the second weld tab land.

The above and other features, elements, characteristics, steps, and advantages of the present invention will become more apparent from the following detailed description of embodiments of the present invention with reference to the attached drawings.

DETAILED DESCRIPTION OF EMBODIMENTS

The cable connector systems described herein are able to transport, i.e., transmit and/or receive, signals up to 56 GHz NRZ and/or 112 PAM4. The cable connector systems may be applied to die package substrates or extension cards attached to die substrates that are 70 mm by 70 mm, 75 mm by 75 mm, 80 mm by 80 mm, 85 mm by 85 mm, 90 mm by 90 mm, 95 mm by 95 mm, 100 mm by 100 mm, 105 mm by 105 mm, 110 mm by 110 mm, or any die package having N by N dimensions, where N is greater than or equal to 70 mm and N is less than or equal to 200 mm. The cable connector systems can also be applied to a substrate that includes a die package, a die substrate, or an extension card attached to a die package or die substrate.

Figure 1:
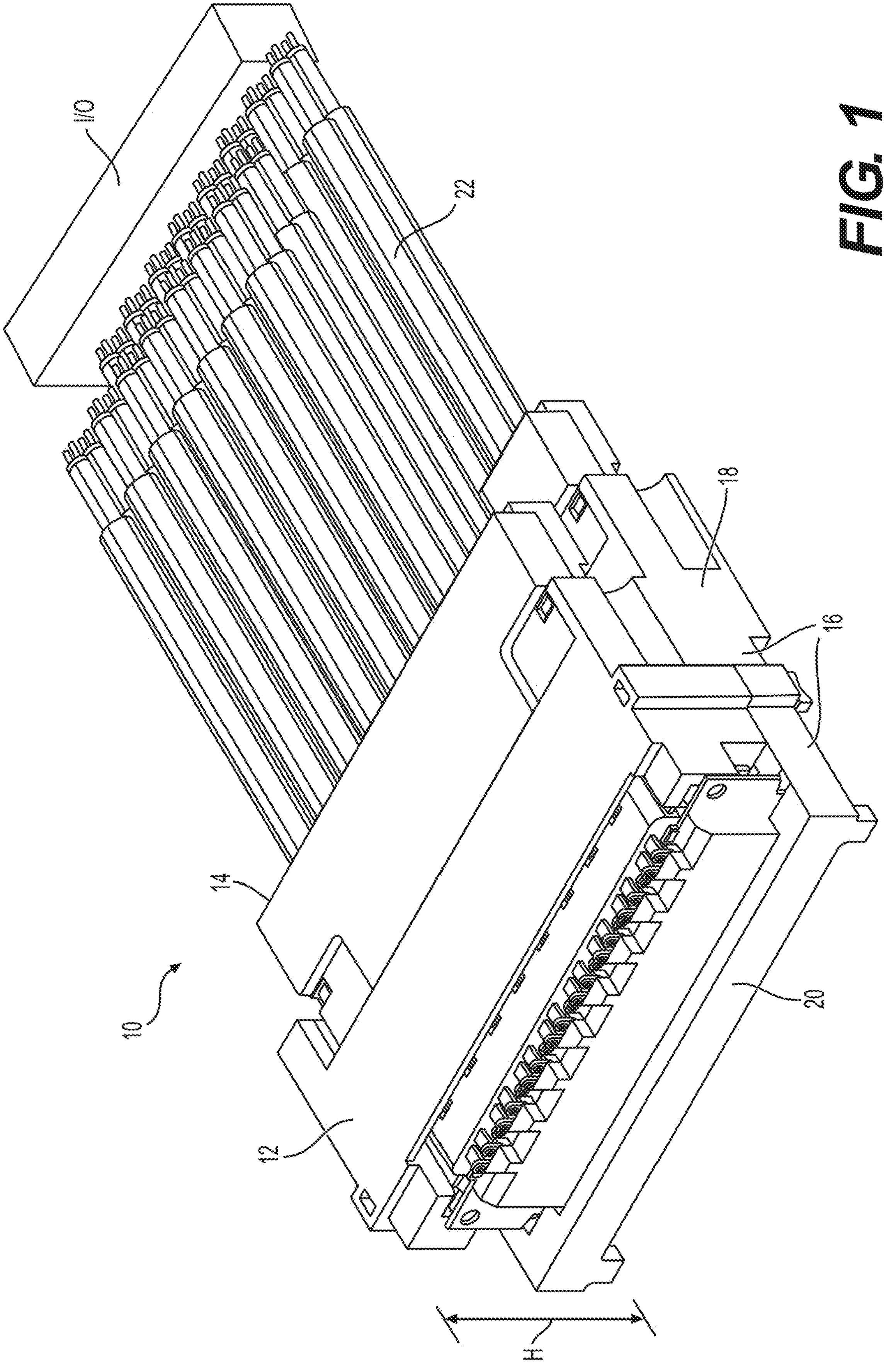
FIG. 1 is a perspective top view of a cable connector system.

FIG. 1 shows a cable connector system 10. A cable connector system 10 can include a board connector 12 and at least one, at least two, at least three, at least four, or four or more cable connectors 14. The board connector 12 can be configured to electrically, physically, or electrically and physically connect to a suitable substrate (not shown in FIG. 1), including, for example, a die package, a die substrate, an extension card attached to a die package or a die substrate, a host substrate, etc. The board connector 12 can include a housing 16, which can include a first housing 18 and a second housing 20. The cable connector or connectors 14 can include one or more cables 22 and can each be releasably connected to the board connector 12, perhaps in order starting with the cable connector 14 closest to a surface of a mounting substrate. Alternatively, the order can be reversed, starting with the cable connector 14 farthest in distance (height H) from a surface of the mounting substrate, or the cable connectors 14 can be simultaneously mated to the board connector 12. The cable connectors 14 can be connected to a board connector 12 or the first housing 18 of the board connector 12 by inserting the cable connectors 14 from a direction parallel or substantially parallel, within manufacturing tolerances, to the surface of the substrate on which the board connector 12 is mounted. Each cable connector 14 can be attached to one end of a cable 22, and an opposed end of the cable 22 can be attached to a panel connector, a board connector, I/O connector (as shown, for example, in FIG. 30), etc. The board connector 12 and/or the cable connector(s) 14 can include a magnetic absorbing material that is either electrically conductive or electrically non-conductive. The magnetic absorbing material can be located, for example, on the housings and/or on the conductors of the board connector 12 and/or the cable connector 14. With the vertically stacked arrangement of cable connectors 14, it is possible to achieve a stack height of the cable connector system 10, that is determined by the height H of the housing 16 of the board connector 12, which can be about 1.0 mm to about 7.0 mm tall, or about 1.7 mm to about 6.8 mm, or about 1.7 mm to about 4 mm, or about 4 mm to about 7 mm, or about 5 mm to about 8 mm, depending on the total number of rows of cable connectors 14. The portion of the cables 22 adjacent to or connected to the cable connectors 14 can extend parallel or substantially parallel, within manufacturing tolerances, to a substrate to which the board connector 12 is mounted. Each cable connector 14, alone, can have a height of approximately 1 mm, within manufacturing tolerances.

Figure 2:
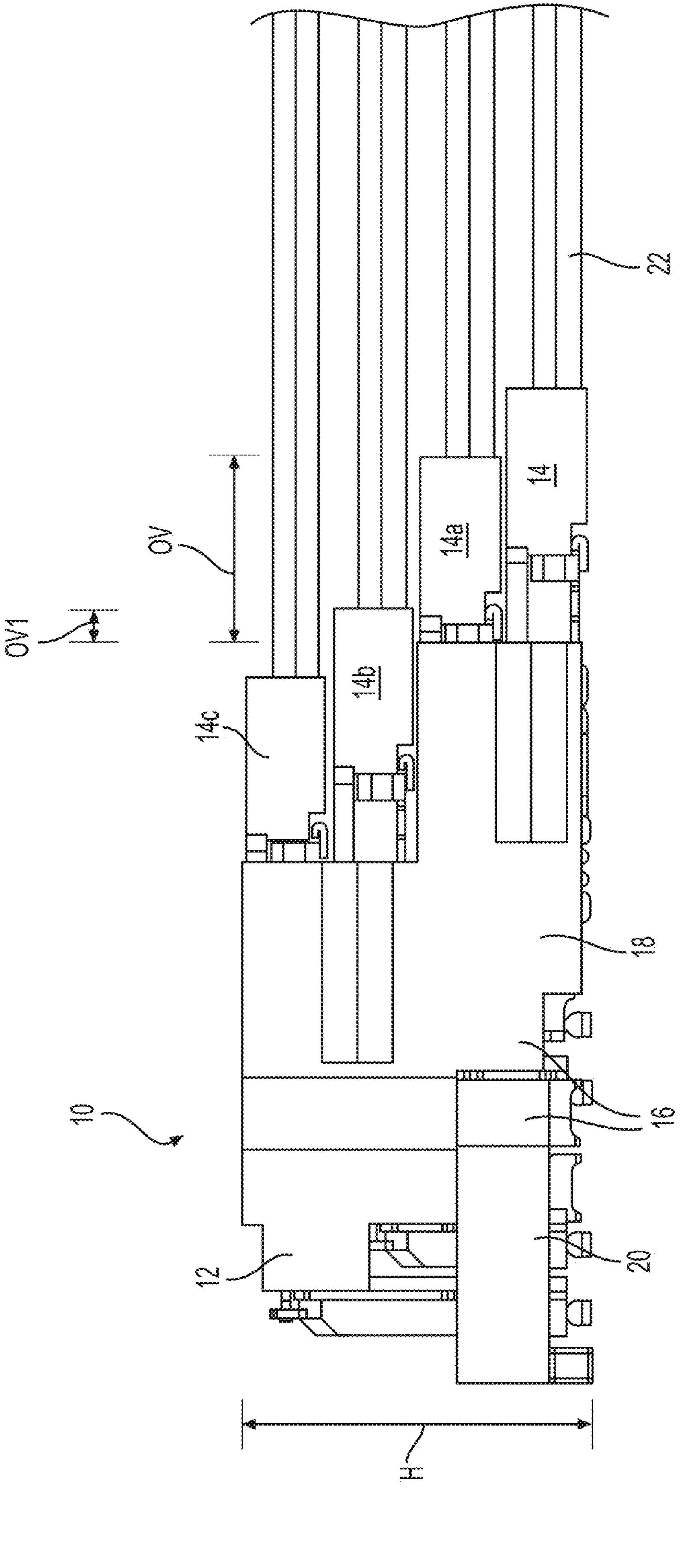
FIG. 2 is a side view of the cable connector system shown in FIG. 1.

FIG. 2 shows a cable system 10 that can include a board connector 12 that has a height H and cable connectors 14 that are vertically stacked such that each cable connector 14*a*, 14*b*, 14*c*, 14*d* does not fully overlap an immediately adjacent cable connector 14. Each cable connector 14 can include corresponding copper cables 22, such as shielded differential twin axial cables. The board connector 12 can include a housing 16, that can include a first housing 18 and a second housing 20. Where there are at least three vertically stacked cable connectors 14, 14*a*, 14*b*, an overlap OV between a first cable connector 14 and an immediately adjacent second cable connector 14*a* can be larger than an overlap OV1 between the second cable connector 14*a* and the third cable connector 14*b*.

Figure 3:
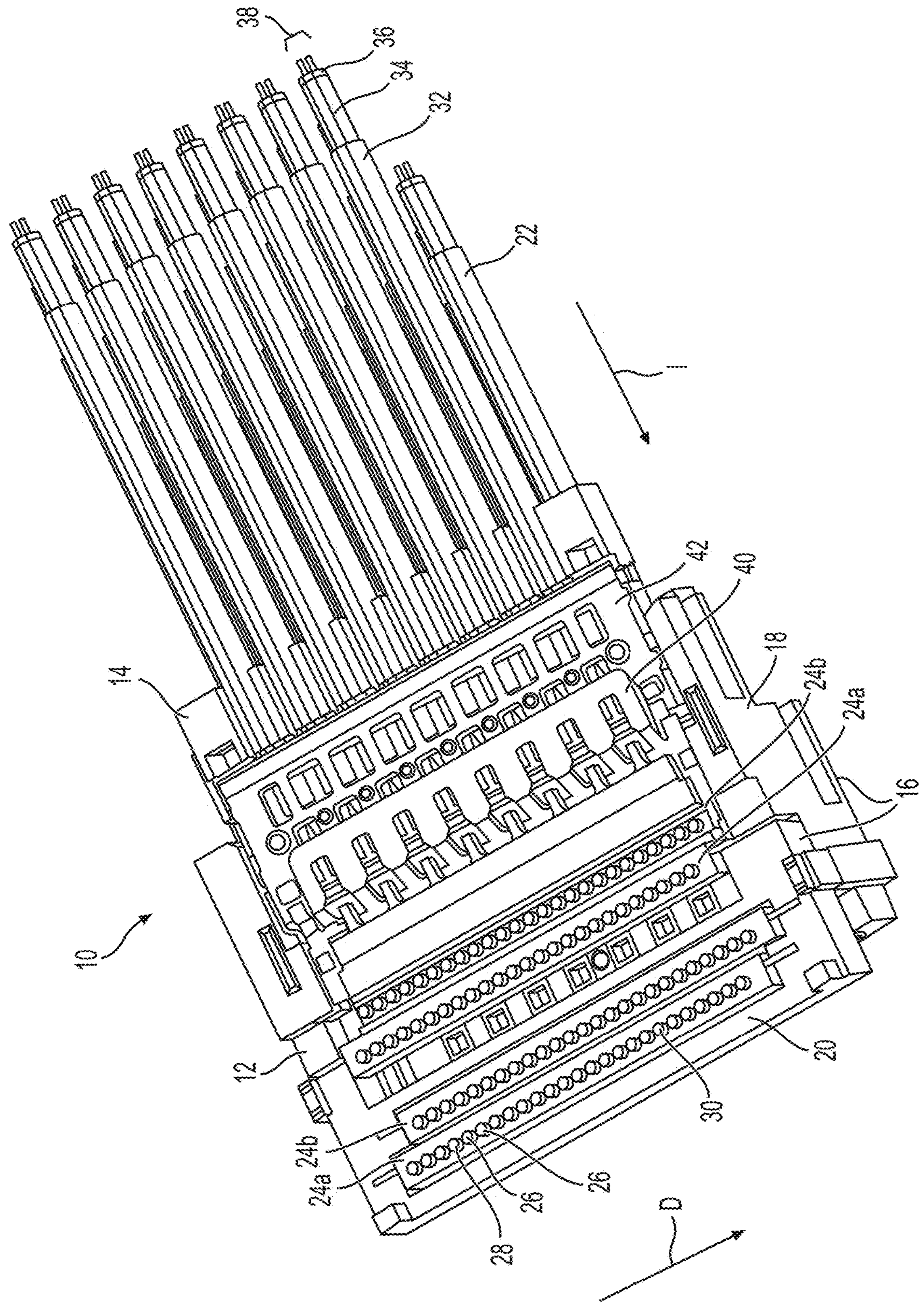
FIG. 3 is a perspective bottom view of the cable connector system shown in FIG. 1.

FIG. 3 is a bottom perspective view of the cable connector system 10 shown in FIGS. 1 and 2. A board connector 12 that can have a two-part housing 16, divided into separate or integrally formed first and second housings 18, 20. The cable connector system 10 can include connectors 14 and respective cables 22 and leadframe assemblies 24*a*, 24*b*, wherein the leadframe assemblies 24*a*, 24*b* can each include electrical conductors, such as signal conductors 26 or optional ground conductors 28. The electrical conductors can be evenly spaced apart, centerline to centerline. A distance between respective centerlines of two adjacent electrical conductors can define a conductor pitch. A board connector shield 40 can terminate in ground/power/reference conductors 28 and can be positioned adjacent to a corresponding one of the leadframe assemblies 24*a*, 24*b*. Alternatively, a leadframe assembly 24*a*, 24*b* can be molded or insert molded with a board connector shield 40. Each signal conductor 26 can terminate in a solder ball 30, a solder slug, any suitable SMT, any through hole or plated through hole technology, etc.

If there are N number of cable connectors 14, then the corresponding board connectors 12 can include N number of leadframe assemblies 24*a*, 24*b* or wafers, one for each corresponding cable connector 14. If there are a total of P number of cables 22 in a corresponding cable connector 14, then the corresponding board connector 12 can include 2×P electrical conductors 26, 28, assuming each cable 22 is a twin axial cable with two center cable conductors 38. If the cables 22 only have a single center cable conductor 38, then the board connector 12 can include P electrical conductors, such as signal conductors 26 and optional ground conductors 28.

Two sets of immediately adjacent leadframe assemblies 24*a*, 24*b* are shown. Two immediately adjacent leadframe assemblies 24*a*, 24*b* can be offset with respect to each other in a horizontal direction D that is perpendicular to an insertion direction I of the cable connectors 14. As shown in FIG. 3, every leadframe assembly 24*a* is horizontally offset with respect to every other leadframe assembly 24*b* in the housing 16. Each cable 22 can be a shielded cable that can include an insulative jacket 32, an electrically conductive cable shield 34, a cable dielectric 36, and a single cable conductor or a pair of cable conductors 38. A board connector shield 40 can electrically, physically, or electrically and physically connect to a corresponding cable connector shield 42. Each cable shield 34 can electrically, physically, or electrically and physically connect with a corresponding cable connector shield 42.

Figure 4:
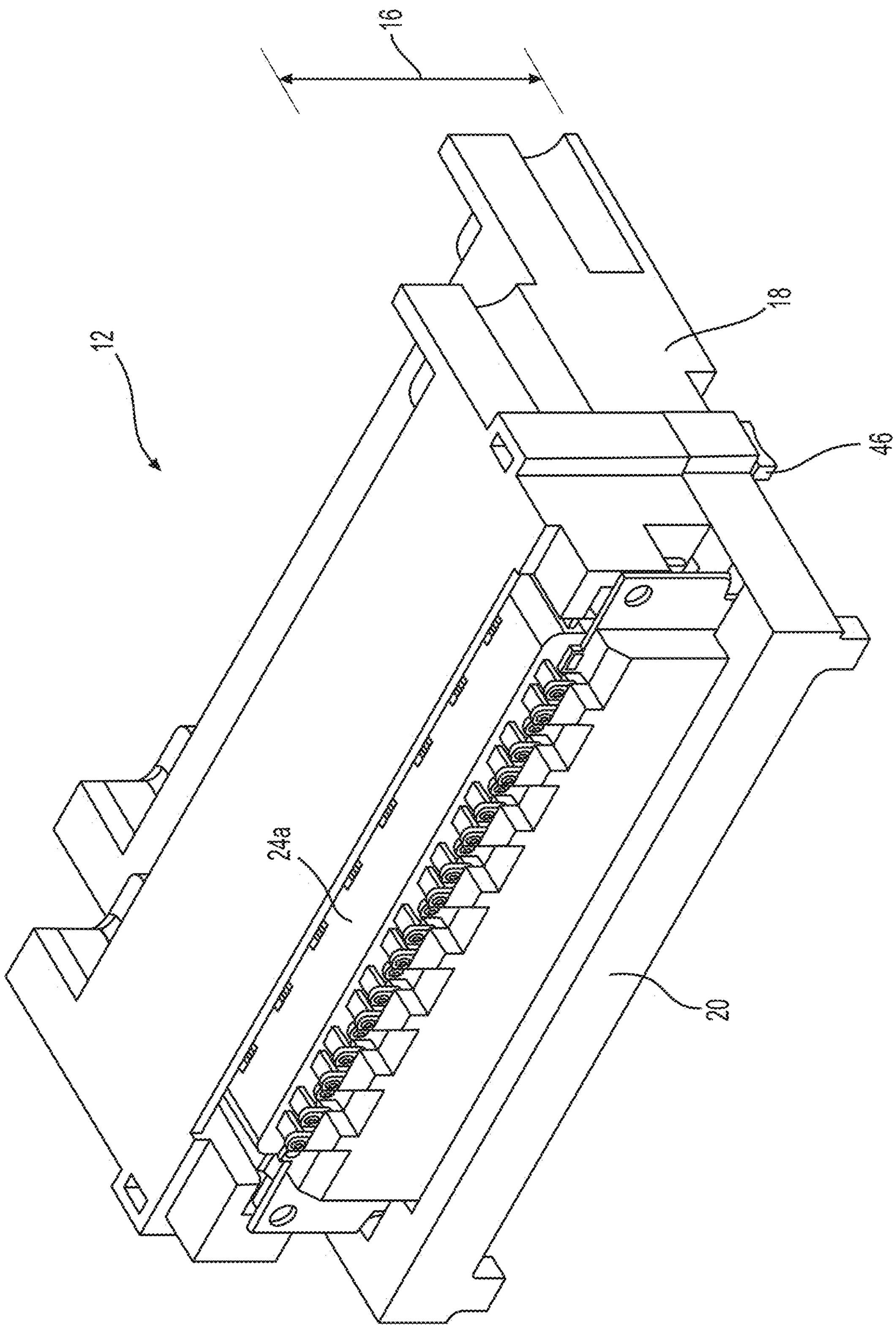
FIG. 4 is a perspective top view of a board connector shown in FIG. 1.

FIG. 4 is similar to FIG. 1, but with the cable connectors 14 removed. The board connector 12 can include a housing 16. The housing 16 can include a first housing 18, a second housing 20, and one or more leadframe assemblies 24*a*, 24*b*. Although the housing 16 can receive four leadframe assemblies 24*a*, 24*b*, any number of leadframe assemblies 24*a*, 24*b* can be used. The first housing 18 or second housing 20 can define or include one or both of a standoff and a retention tab 46.

Figure 5:
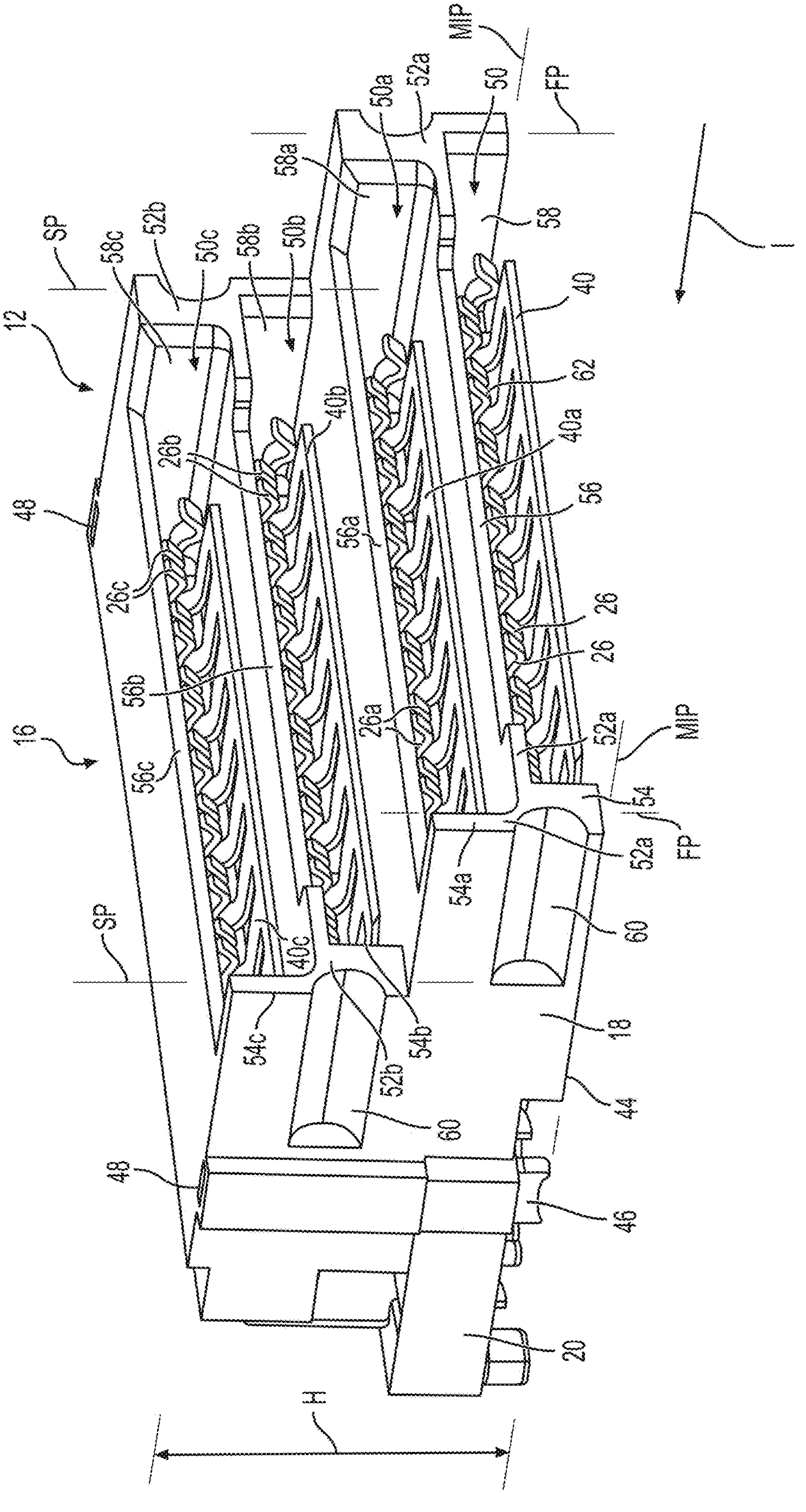
FIG. 5 is a perspective front view of the board connector shown in FIG. 1.

As shown in FIG. 5, the first housing 18 and the second housing 20 can be connected together by inserting the retention tabs 46 into corresponding housing holes 48 in the first housing 18. Alternatively, the retention tabs 46 and the corresponding housing holes 48 can be reversed. In general, the first and second housings 18, 20 can be connected in any suitable manner. The retention tabs 46 can also be used to secure the board connector 12 to a substrate. For example, the retention tabs 46 can be soldered to a substrate.

The housing 16 or first housing 18 can define four slots 50, 50*a*, 50*b*, 50*c*. At least one or both of the first slot 50 and second slot 50*a* can each open at first board connector mating interface surfaces 52*a* of the housing 16 or first housing 18. At least one or both of the third slot 50*b* and fourth slot 50*c* can each open at second board connector mating interface surfaces 52*b* of the housing 16 or the first housing 18. The first board connector mating interface surface 52*a* can each lie in a first plane FP that is generally perpendicular to a mounting interface plane MIP that is parallel to a board connector mounting interface surface 44 of the housing 16. The second board connector mating interface surfaces 52*b* can each lie in a second plane SP that is generally perpendicular to the mounting interface plane MIP. The first plane FP and the second plane SP can be parallel to each other, and both generally perpendicular to the mounting interface plane MIP. The first board connector mating interface surfaces 52*a* and the second board connector mating interface surfaces 52*b* can be spaced apart from one another. The second board connector mating interface surfaces 52*b* can be positioned vertically above the first board connector mating interface surfaces 52*a*, and can be recessed away from the first board connector mating interface surfaces 52*a* in a direction toward the second housing 20.

Each of the four slots 50, 50*a*, 50*b*, 50*c* can receive a corresponding one of four cable connectors 14. A different number of slots 50-50*c* can be included if a corresponding different number of cable connectors 14 is used. The slots 50-50*c* can each be positioned parallel to one another. A first slot 50 may be positioned immediately adjacent to a mounting substrate, such as a printed circuit board (PCB) (shown, for example, in FIG. 12), and stacked vertically over each other in a direction along the height H of the housing 16. The first slot 50 can be defined by a first wall 54, a first housing wall 56, and a third wall 58. Three walls 54, 56, 58 are shown, but a fourth wall that spans the first and third walls 54, 58 can also be used. When only three walls 54, 56, 58 are used, the first slot 50 leaves a portion of a mounting substrate exposed. A second slot 50*a* may be defined by four walls, such as a first wall 54*a*, a second housing wall 56*a*, a third wall 58*a*, and the first housing wall 56 of the first slot 50. Mating ends 62 of signal conductors 26 and board connector shields 40 can protrude into the respective slots 50, 50*a*. In this embodiment, the first slot 50 and the second slot 50*a* can be horizontally offset, such that a pair of signal conductors 26 positioned in the first slot 50 can be offset from a corresponding pair of signal conductors 26*a* positioned in the second slot 50*a* in a horizontal direction by a partial row pitch, a full row pitch, more than a row pitch, a full conductor pitch, at least two conductor pitches, at least three conductor pitches, more than two conductor pitches, or more than three conductor pitches. A conductor pitch can be the distance between centerlines of two adjacent signal conductors. For a row pitch, a corresponding pair of signal conductors can have the same position numbers, such as the last two signal conductors 26*b* positioned in the third slot 50*b*, in a left-to-right direction, and the last two signal conductors 26*c* positioned in the fourth slot 50*c*, in a left-to-right direction. The first housing 18 can define indents 60. The indents 60 can be defined such that there is an indent 60 aligned at an end of each row or slot 50-50*c*. The indents 60 can alternate, slot to slot or row to row, such that there are an equal number of indents 60 on each side of the housing 16 or first housing 18.

A third slot 50*b* may be vertically stacked over the first slot 50 and the second slot 50*a* and can be positioned immediately adjacent to the second slot 50*a* in a vertical direction along a height H of the housing 16. The third slot 50*b* can be defined by a first wall 54*b*, a third housing wall 56*b*, a third wall 58*b*, and the second housing wall 56*a* of the second slot 50*a*. A fourth slot 50*c* may be vertically stacked over the first slot 50, the second slot 50*a*, and the third slot 50*b* and can be positioned immediately adjacent to the third slot 50*b* in a vertical direction along a height H of the housing 16. The fourth slot may be defined by four walls, such as a first wall 54*c*, a fourth housing wall 56*c*, a third wall 58*c*, and the third housing wall 56*b* of the third slot 50*b*.

Mating ends 62 of signal conductor pairs 26*b*, 26*c* and board connector shields 40*b*, 40*c* can protrude into the respective slots 50*b*, 50*c*. Similar to the first and second slots 50, 50*a*, the third slot 50*b* and the fourth slot 50*c* can be horizontally offset in a direction perpendicular to an insertion direction I of cable connectors 14, such that a signal conductor 26*b* pair positioned in third slot 50*b* can be offset from corresponding signal conductor pair 26*c* positioned in the fourth slot 50*c* by a partial row pitch, a full row pitch, or more than a row pitch.

Figure 6:
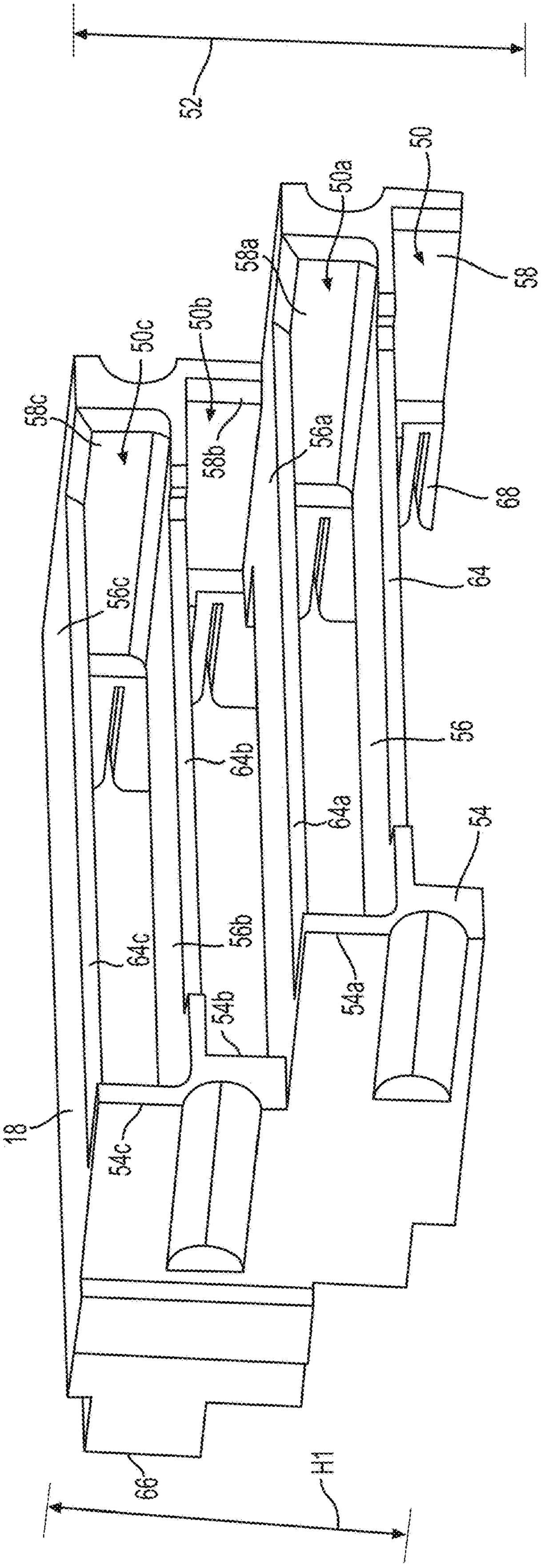
FIG. 6 is a perspective front view of a first housing shown in FIG. 1.

FIG. 6 shows a first housing 18. A first slot 50 can be defined by at least three walls or only three walls, such as the first wall 54, the opposed third wall 58, and the first housing wall 56 that can span the first wall 54 and the opposed third wall 58. The first housing wall 56 can partially define the first slot 50 and the second slot 50*a*. The first housing wall 56 can define a first wall edge 64.

A second slot 50*a* can be defined by at least four walls or only four walls, such as the first wall 54*a*, the opposed third wall 58*a*, the first housing wall 56 that can span the first wall 54*a* and the opposed third wall 58*a*, and the second housing wall 56*a* that can span the first wall 54*a* and the opposed third wall 58*a*. Second housing wall 56*a* can partially define both the second slot 50*a* and the third slot 50*b* and can define a second wall edge 64*a*.

A third slot 50*b* can be defined by at least four walls or only four walls, such as the first wall 54*b*, the opposed third wall 58*b*, the second housing wall 56*a* that can span the first wall 54*b* and the opposed third wall 58*b*, and the third housing wall 56*b* that can span the first wall 54*b* and the opposed third wall 58*b*. Third housing wall 56*b* can partially define both the third slot 50*b* and the fourth slot 50*c* and can define a third wall edge 64*b*.

A fourth slot 50*c* can be defined by at least four walls or only four walls, such as a first wall 54*c*, an opposed third wall 58*c*, a third housing wall 56*b* that can span the first wall 54*c* and the opposed third wall 58*c*, and a fourth housing wall 56*c* that can span the first wall 54*c* and the opposed third wall 58*c*. Third housing wall 56*b* can partially define both the third slot 50*c* and the fourth slot 50*d*. The fourth housing wall 56*c* and can define a fourth wall edge 64*c*. All of the slots 50-50*c* can have the same width, the same depth, different widths, or different depths.

The first wall edge 64, the second wall edge 64*a*, the third wall edge 64*b*, and the fourth wall edge 64*c* can each be vertically stair-stepped along a height H1 of the first housing 18. For example, the first wall edge 64 of the first housing wall 56 can be positioned farther away from a rear, vertical wall 66 of the first housing 18 than the second wall edge 64*a*, the third wall edge 64*b*, or the fourth wall edge 64*c*. As measured from the rear, the vertical wall 66 of the first housing 18, the second wall edge 64*a* can be positioned farther away from the rear, vertical wall 66 than the third wall edge 64*b* and the fourth wall edge 64*c*. Alternatively, the first wall edge 64 and the second wall edge 64*a* can each be spaced the same distance from the rear, vertical wall 66 of the first housing 18. As measured from the rear, vertical wall 66 of the first housing 18, the third wall edge 64*b* can be positioned farther away from the rear, vertical wall 66 of the first housing 18 than the fourth wall edge 64*c* of the fourth housing wall 56*c*. Alternatively, the third wall edge 64*b* and the fourth wall edge 64*c* can each be spaced the same distance from the rear, vertical wall 66 of the first housing 18. Grooves 68 can receive portions of a corresponding molded leadframe assembly 24*a*, 24*b*.

Figure 7:
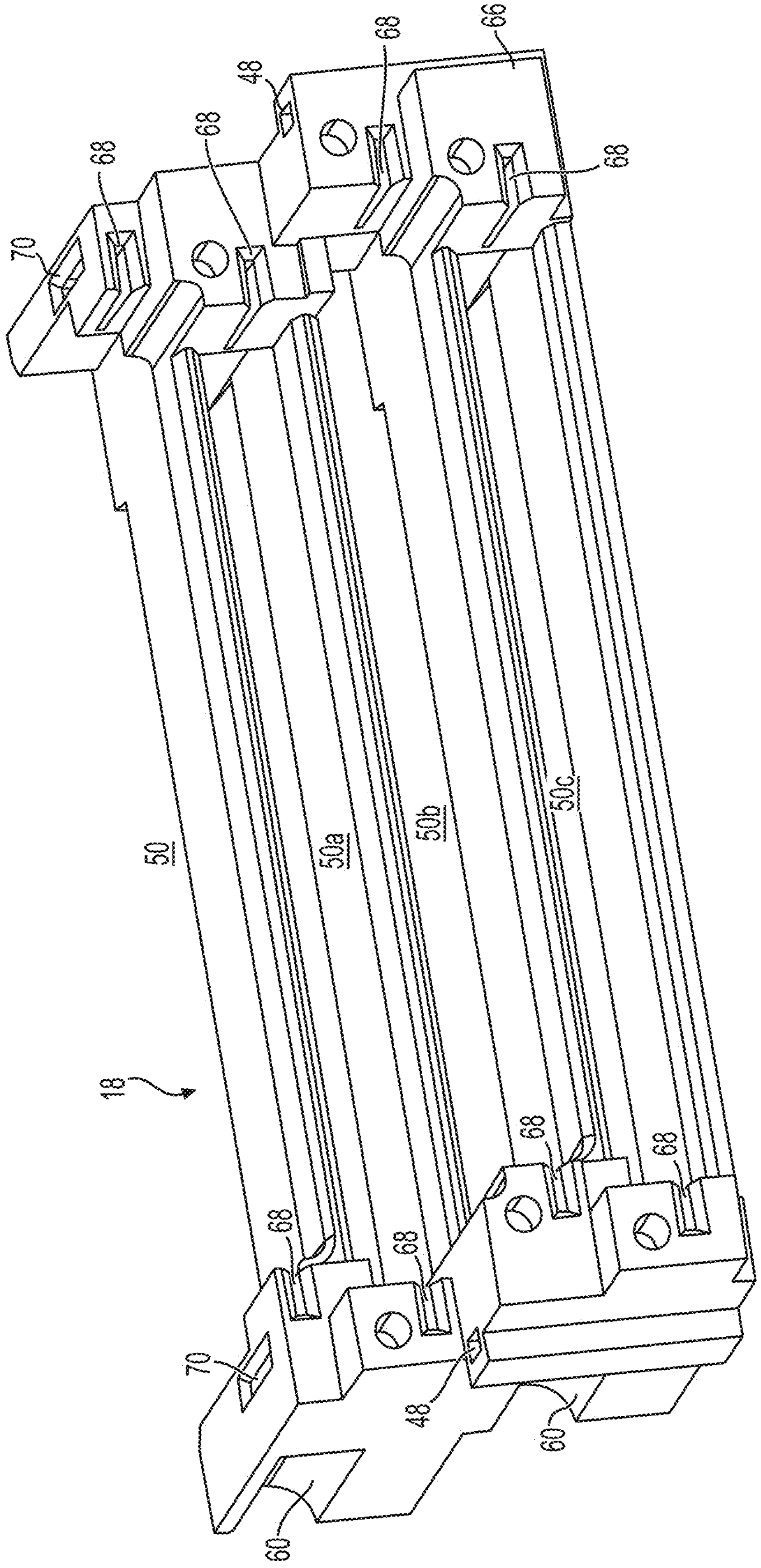
FIG. 7 is a perspective rear view of a first housing shown in FIG. 1.

As shown in FIG. 7, each slot 50, 50*a*, 50*b*, 50*c* can have a corresponding pair of grooves 68 into which a corresponding molded leadframe assembly 24*a*, 24*b* or wafer can be inserted. Grooves 68 in immediately adjacent slots can be offset from one another in a horizontal direction, which results in corresponding leadframe assemblies 24*a*, 24*b* being offset from one another. To ensure consistent electrical performance, indents 60 can be provided in the first housing 18 to ensure that each slot 50*a*-50*c* has approximately the same amount of dielectric material on each side. The first housing 18 can have weld tab holes 70 into which weld tabs can be inserted. These weld tabs are not used to connect the first housing 18 to the second housing 20, but can be used to secure the first housing 18, and thus the board connector 12, to a mounting substrate.

Figure 8:
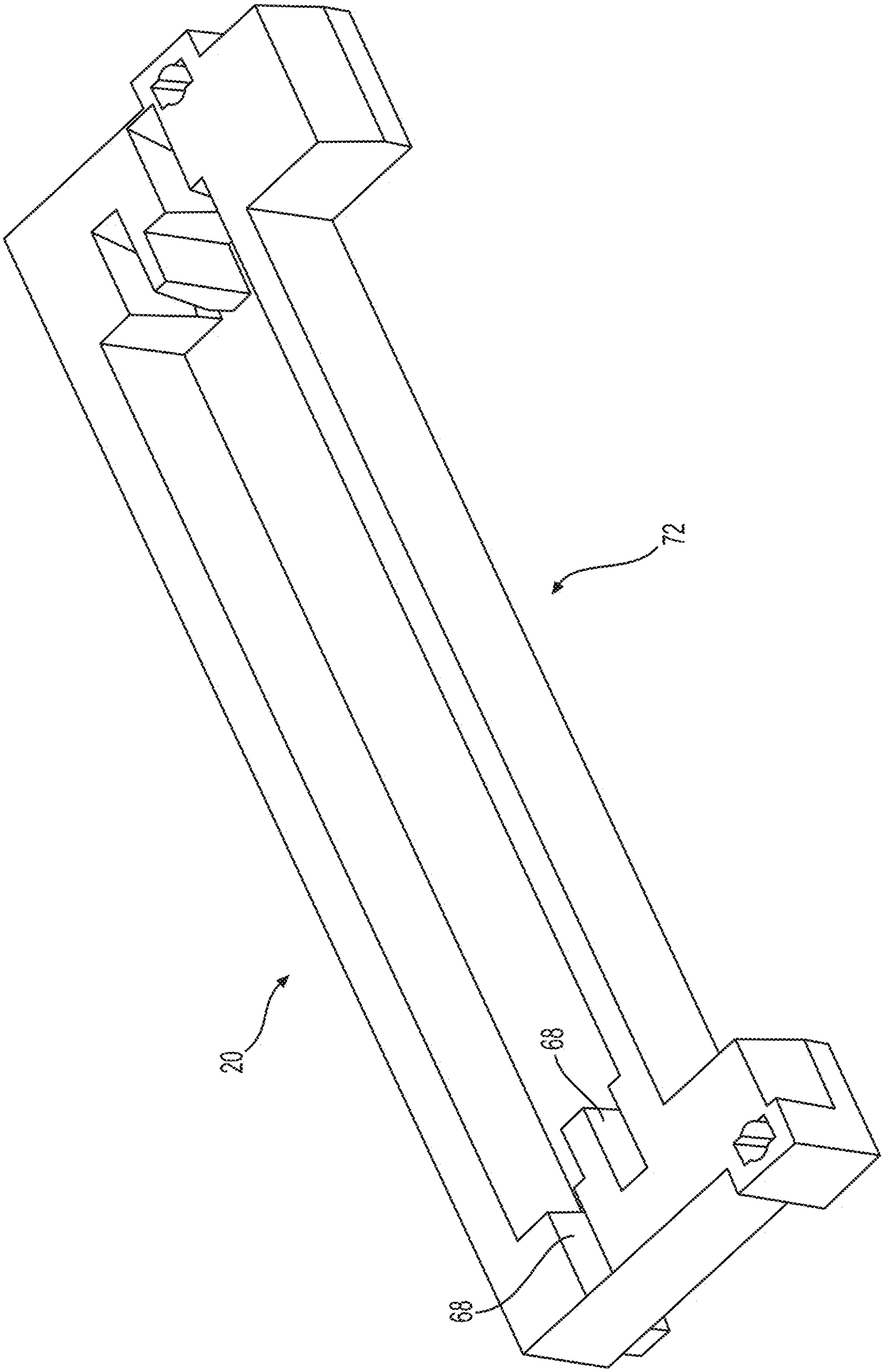
FIG. 8 is a perspective top view of a second housing shown in FIG. 1.

As shown in FIG. 8, the second housing 20 can include grooves 68 into which wafers or leadframe assemblies 24*a*, 24*b* can be inserted. Opposed pairs of grooves 68 can be offset to ensure that the leadframe assemblies 24*a*, 24*b* are offset with respect to each other. The second housing 20 can include a notch 72 which can receive a leadframe assembly included in the first housing 18. The second housing 20 can be used to more accurately position leadframe assemblies 24*a*, 24*b* included in the second housing 20 and the first housing 18 which, in turn, more accurately position conductor mounting ends, solder balls, etc. of the signal conductors 26 and ground plane 40 tails with corresponding SMT pads, plated through holes, or other suitable termination defined on a surface of a mating substrate. The second housing 20 also provides mechanical stability to the overall housing 16.

Figure 9:
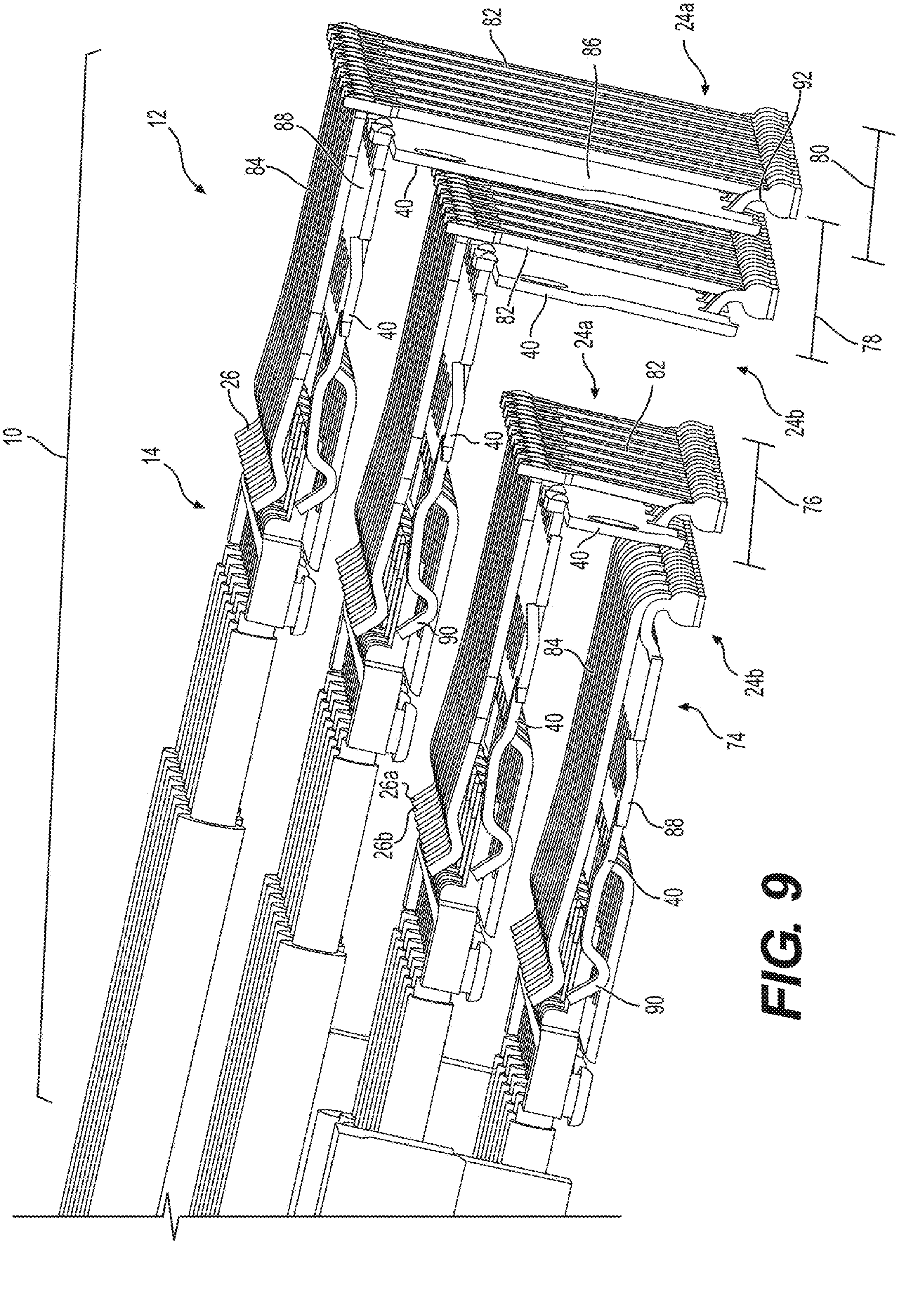
FIG. 9 is a perspective side view of the conductors of mated leadframe assemblies shown in FIG. 1, without any plastic or overmolding.

FIG. 9 is another view of the cable connector system 10 without the housing 16, including the first housing 18 and the second housing 20 and plastic or overmolding selectively removed from the leadframe assemblies 24*a*, 24*b* of the board connector 12 for clarity. FIG. 9 shows the signal conductors 26 deflected in a mated condition.

A first leadframe assembly 74 can include a second signal section 84 and a second board connector shield section 88. Second, third, and fourth leadframe assemblies 76, 78, 80 can each include a first signal section 82, a second signal section 84, a first board connector shield section 86, and a second board connector shield section 88. First signal sections 82 can be separately attached to the first board connector shield sections 86, and the second signal sections 84 can be separately attached to the second board connector shield sections 88. Alternatively, the second signal sections 84 and respective second board connector shield sections 88 can be molded together, and the first signal sections 82 and respective first board connector shield sections 86 can be molded together. The board connector 12 can be devoid of discrete ground conductors positioned between adjacent signal conductors 26 or between adjacent signal conductor pairs 26*a*, 26*b*.

A first signal section 82 and a corresponding second signal section 84 can define a right angle. A first signal section 82 of the third leadframe assembly 78 can be longer in length and taller in height than a first signal section 82 of the second leadframe assembly 76. A first signal section 82 of the fourth leadframe assembly 80 can be longer in length and taller in height than a first signal section 82 of the third leadframe assembly 78.

In the second, third, and fourth leadframe assemblies 76, 78, 80, respective first and second signal sections 82, 84 can be connected together in any suitable manner, including, for example, by soldering, welding, sonic welding, laser welding, etc. A first board connector shield section 86 and a respective second board connector shield section 88 of each board connector shield 40 can be connected together in any suitable manner, such as the methods discussed in this paragraph with respect to first and second signal sections 82, 84. In one embodiment, signal conductors 26 of the second signal section 84 are inserted into a corresponding one of holes defined by signal conductors 26 of the second signal section 84 and the first and second signal sections 82, 84 are soldered or welded. A first board connector shield section 86 and a second board connector shield section 88 can be similarly attached. Board connector shield tail 92 can extend from the board connector shield 40 and be in-line with tails of signal conductors 26 carried by a corresponding first signal section 82.

Figure 10:
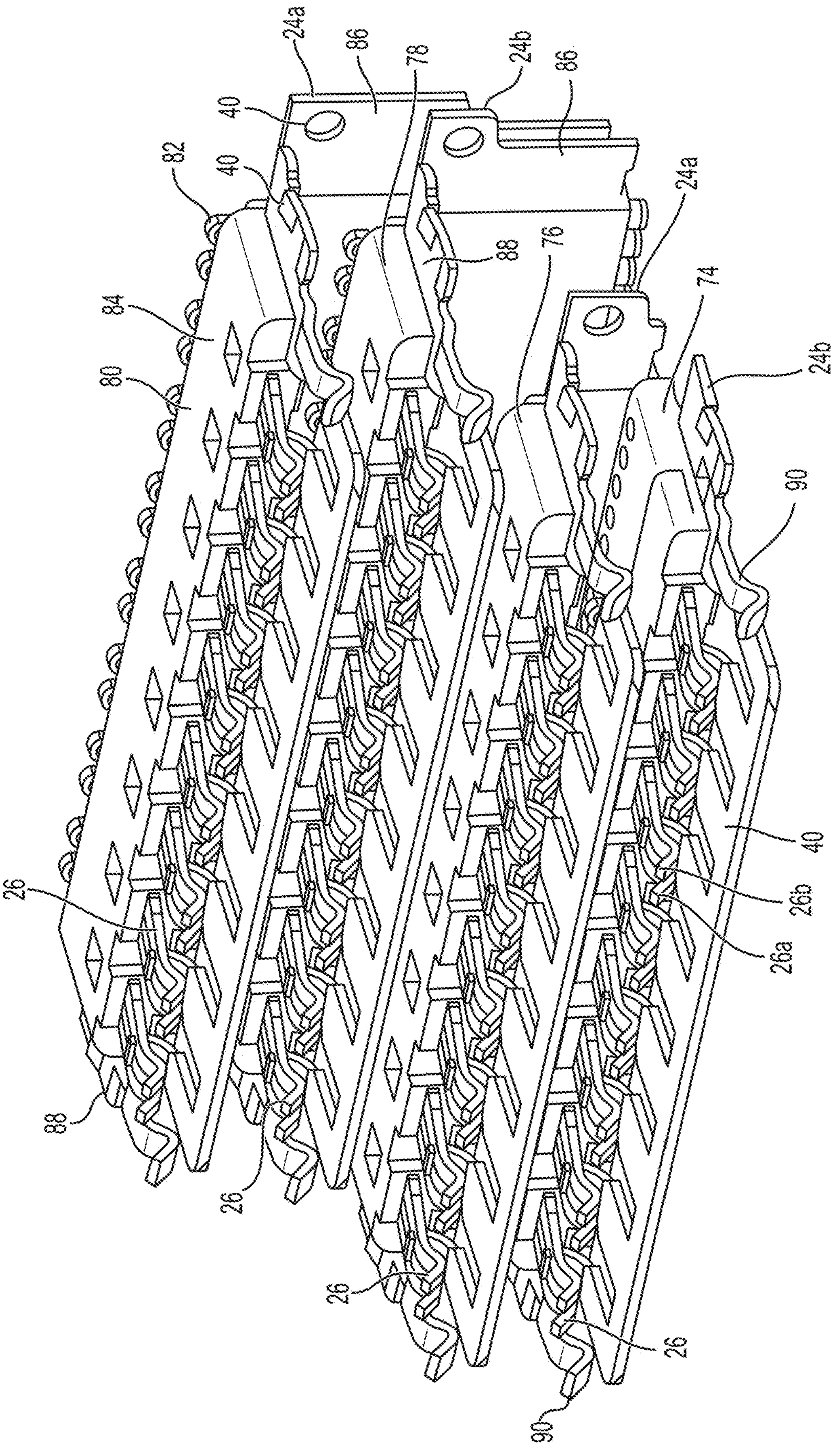
FIG. 10 is a perspective front view of leadframe assemblies.

FIG. 10 is similar to FIG. 9, except the first leadframe assembly 74 and the second leadframe assembly 76 are not horizontally offset with respect to each other in a vertically stacked or height direction, and the third leadframe assembly 78 and the fourth leadframe assembly 80 are not horizontally offset with respect to each other in a vertically stacked or height direction. However, the first leadframe assembly 74 and second leadframe assembly 76 are both offset with respect to the third leadframe assembly 78 and the fourth leadframe assembly 80 in a vertically stacked or height direction. All of the leadframe assemblies 74, 76, 78, 80 are independent of each other, so the first, second, third and fourth leadframe assemblies 74, 76, 78, 80 shown in FIGS. 9 and 10 can be used with any of the cable connector systems 10, 10A, 10B, 10C shown herein. As discussed above, leadframe assemblies 24*a*, 24*b*, such as first, second, third and fourth leadframe assemblies 74, 76, 78, 80 can be inserted into the housing 16, perhaps via grooves 68, and retained in the housing 16 by an interference fit. Each of the board connector shields 40 can include one or more arms 90 that can engage with a cable connector shield 42 of a corresponding cable connector 14. The signal conductors 26 can be grouped together in signal conductor pairs 26*a*, 26*b* to transmit differential signals.

Figure 11:
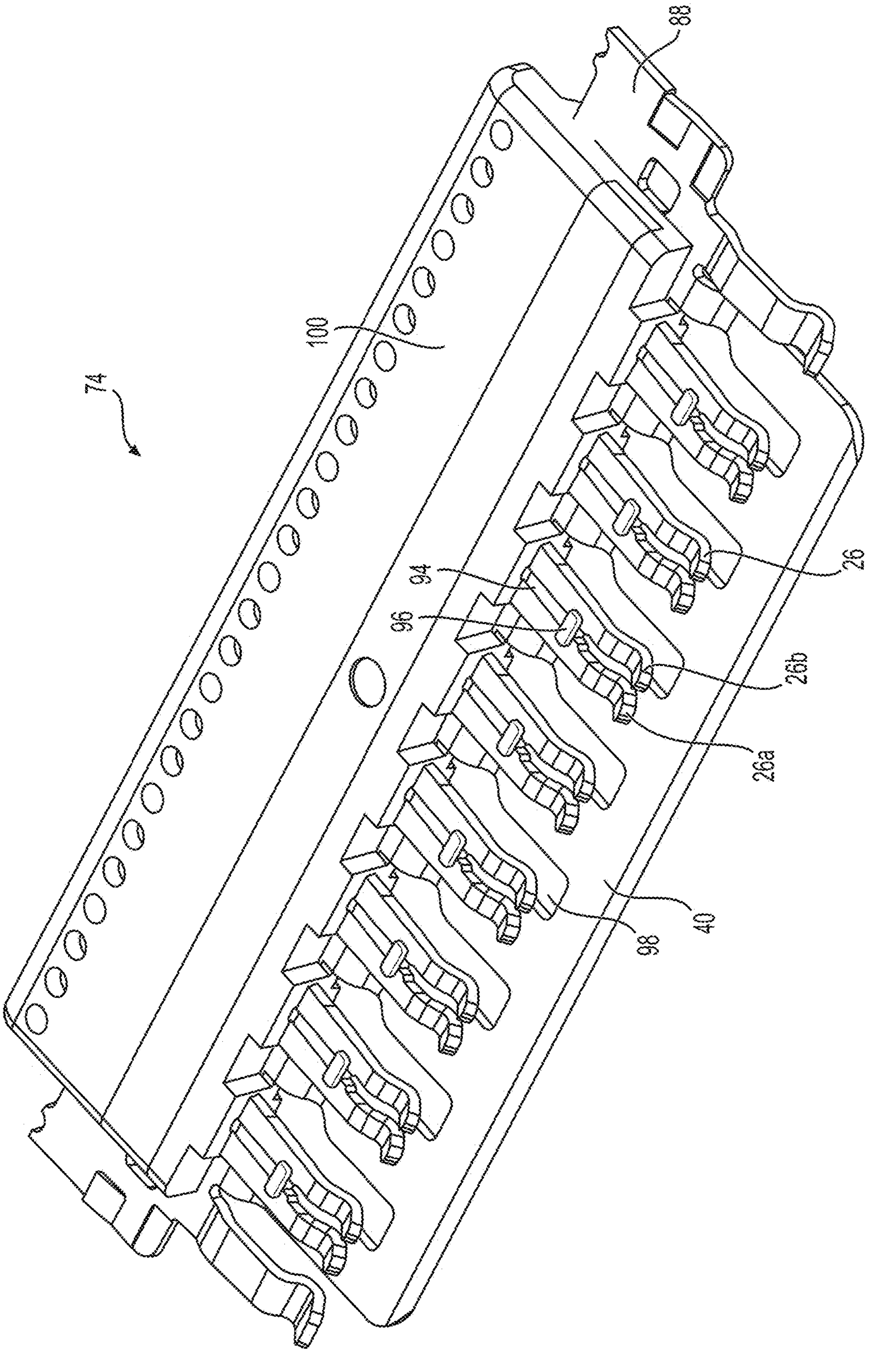
FIG. 11 is a perspective top view of a first leadframe assembly shown in FIG. 10.

A first leadframe assembly 74 is shown in FIG. 11, but this paragraph applies to all leadframe assemblies 24*a*, 24*b*. Each signal conductor pair 26*a*, 26*b* of signal conductors 26 can include a cantilevered web 94 that extends between facing edges of the pair 26*a*, 26*b* of signal conductors 26 and a button 96 located on a side of the signal conductor pair 26*a*, 26*b*. The web 94 and/or button 96 are optional. Each board connector shield 40 can define a cutout or air void 98 directly beneath a signal conductor pair 26*a*, 26*b*. Each leadframe assembly 24*a*, 24*b* can include an insert 100 that surrounds portions of the signal conductors 26. The insert 100 can be manufactured by insert molding a dielectric material around the signal conductors 26. The insert 100 can also surround a portion of a second board connector shield section 88. Alternatively, each molded leadframe assembly 24*a*, 24*b* can have its own insert 100, and each second board connector shield section 88 can have its own insert 100. The leadframe assemblies 24*a*, 24*b* can be devoid of signal conductors 26 positioned between adjacent signal conductor pairs 26*a*, 26*b*.

Figure 12:
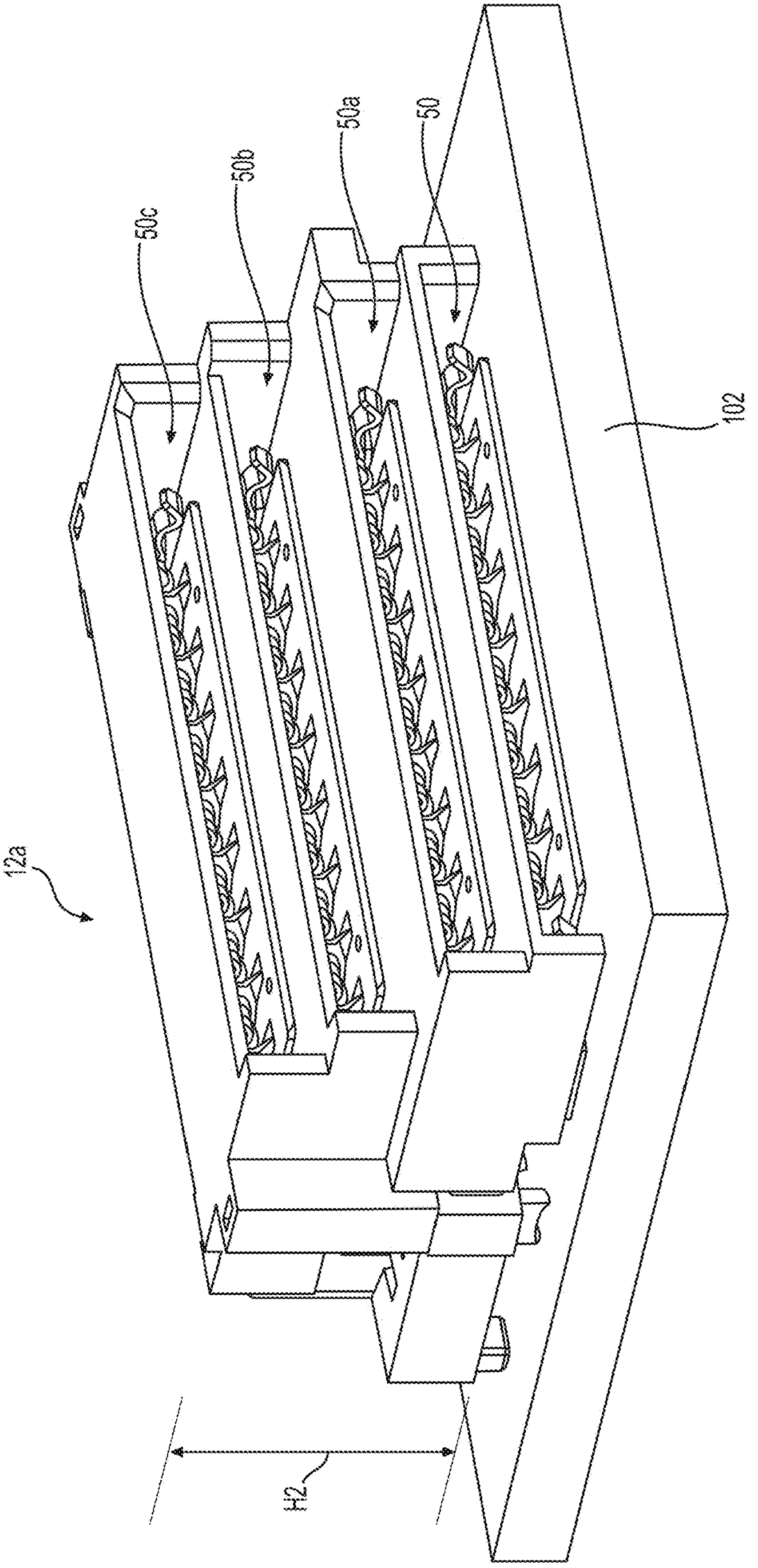
FIG. 12 is a perspective front view of a board connector including the leadframe assemblies shown in FIG. 10.

FIG. 12 is similar to FIG. 5, except the board connector 12A has a different slot arrangement and is shown with an optional mounting substrate 102, such as a PCB. Unlike FIG. 5, wherein the slots 50, 50*a*, 50*b*, 50 are alternatively offset or horizontally staggered in a vertically stacked or height direction H2, the first and second slots 50, 50*a* in FIG. 12 are not horizontally offset or staggered with respect to one another in a vertically stacked, vertically stepped, or height direction H2. The third and fourth slots 50*b*, 50*b* in FIG. 12 are also not horizontally offset or staggered in a vertical stacked direction or height direction H2. However, the third and fourth slots 50*b*, 50*c*, which can generically be described as immediately adjacent first and second slots, can both be horizontally offset or staggered with respect to both the first and second slots 50, 50*a* in a vertically stacked direction, stepped direction, stacked direction, or height direction H2.

Figure 13:
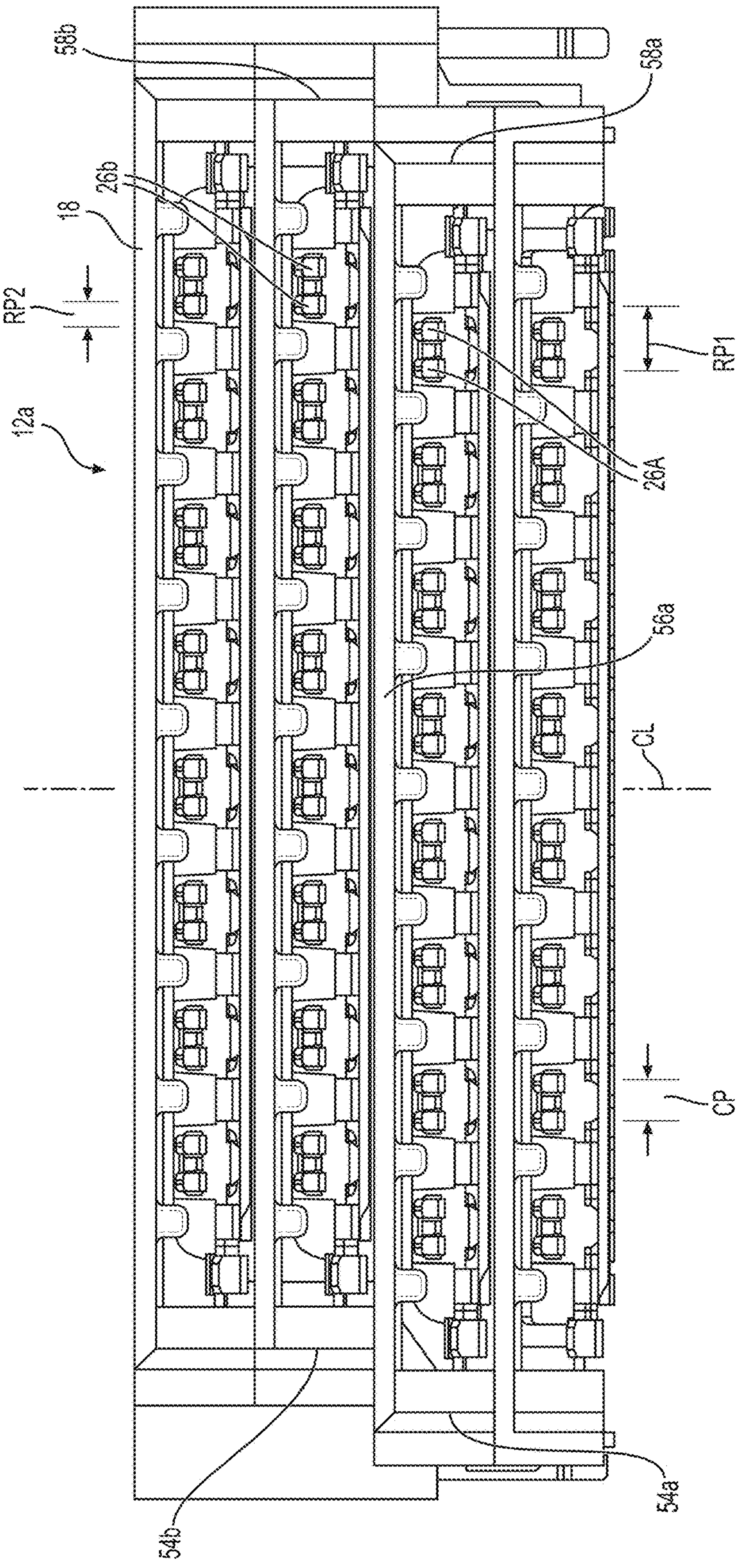
FIG. 13 is a front view of a first housing shown in FIG. 12

FIG. 13 shows a board connector 12A with a first housing 18. A first slot, such as second slot 50*a*, can be partially defined by a first housing wall, such as second housing wall 56*a*, a surface defined by a first wall 54*a*, and a surface defined by an opposed third wall 58*a*. The surface of the first wall 54*a* and the surface of the opposed third wall 58*a* can be evenly spaced from a longitudinal centerline CL positioned between the first wall 54*a* and the third wall 58*a*, parallel to both the first wall 54*a* and the opposed third wall 58*b*. A second slot, such as third slot 50*b*, can be partially defined by a first housing wall, such as a second housing wall 56*a*, a surface defined by a first wall 54*b*, and a surface defined by an opposed third wall 58*b*. The surface of the first wall 54*b* and the surface of the opposed third wall 58*b* can both be unevenly spaced away from the longitudinal centerline CL. Stated differently, FIGS. 1 and 13 show that first and second slots, such as first slot 50 and second slot 50*a* or second slot 50*a* and third slot 50*b*, can be positioned immediately adjacent to each other and can be horizontally offset from each other in a vertically stacked or height direction. Cable connectors 14 inserted in the first and second slots are likewise horizontally offset from each other in a vertically stacked or height direction. As shown in FIGS. 12 and 13, at least four slots 50-50*c* can also be arranged into two pairs of slots. The first pair of slots can be spaced apart, but not horizontally offset with respect to each other in a vertically stacked or height direction. However, a second pair of slots can be horizontally offset from the first pair of slots in a vertical stacked or height direction. The corresponding cable connectors 14 received in the first pair of slots can be horizontally offset in a vertically stacked or height direction with respect to cable connectors 14 received in the second pair of slots. Each of FIGS. 1, 12, 13, and 15 show that in any given pattern of slots, a first slot and an immediately adjacent second slot, such as second and third slots 50*a*, 50*b* in FIGS. 12 and 13, can be offset with respect to each other. As shown in FIGS. 12 and 13, it is also possible to have a first slot and an immediately adjacent second slot that are not horizontally offset with respect to each other.

In this embodiment, one of the electrical conductors, such as signal conductors 26*a*, positioned in the second slot 50*a* (or first slot 50) can be horizontally offset from a corresponding electrical conductor, such as signal conductor 26*b* positioned in the third slot 50*b* (or second slot 50*a*) in a horizontal direction by no row pitch RP1 (i.e., no offset), a partial row pitch RP1 that is less than a full row pitch RP1, a full row pitch RP1, more than a row pitch RP1, a full conductor pitch CP, at least two conductor pitches CP, at least three conductor pitches CP, more than two conductor pitches CP, or more than three conductor pitches CP, where a conductor pitch CP is a distance between centerlines of two adjacent electrical conductors or two adjacent signal conductors 26*a* or 26*b*. Corresponding electrical conductors or signal conductors 26*a*, 26*b* can have the same position numbers, left to right, such as the last signal conductor 26*a* positioned in the second slot 50*a* (or first slot 50) and, left to right, the last signal conductor 26*b* positioned in the third slot 50*b* (or second slot 50*a*).

One pair of signal conductors 26*a* positioned in second slot 50*a* (or first slot 50) can be offset from a corresponding pair of signal conductors 26*b* positioned in the third slot 50*b* (or second slot 50) in a horizontal direction by no conductor row pitch RP2 (i.e., no offset), a partial conductor row pitch RP2 that is less than a full conductor row pitch RP2, a full conductor row pitch RP2, more than a conductor row pitch RP2, a full conductor pitch CP, at least two conductor pitches CP, at least three conductor pitches CP, more than two conductor pitches CP, or more than three conductor pitches CP, where a conductor pitch CP is a distance between centerlines of two adjacent electrical conductors, such as two signal conductors 26*a* or 26*b*. Corresponding pairs of signal conductors 26*a*, 26*b* can have the same position numbers, left to right, such as the last two signal conductors 26*a* positioned in the second slot 50*a* (or first slot 50) and, left to right, the corresponding last two signal conductors 26*b* positioned in the third slot 50*b* (or second slot 50*a*).

Figure 14:
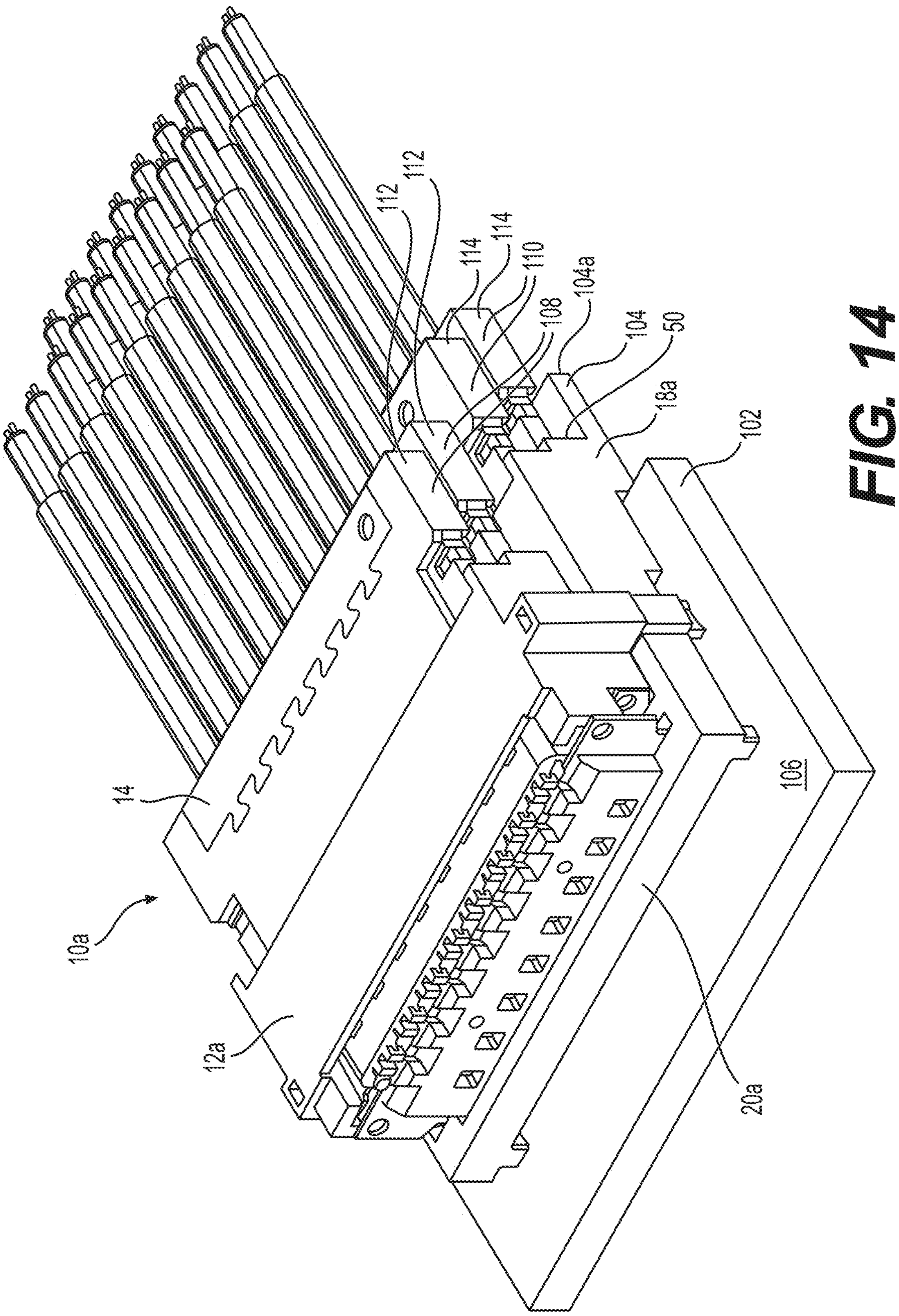
FIG. 14 is a perspective rear view of a cable connector system with an overhanging board connector.

FIG. 14 shows a cable connector system 10A that is similar to FIG. 12, but the first housing 18A of the board connector 12A can define an overhang 104 that extends below the second housing 20A and a major surface 106 of a substrate 102. Cable connectors 14 are arranged in a first pair of cable connectors 108 and a second pair of cable connectors 110. The first pair of cable connectors 108 can both be horizontally offset from the second pair of cable connectors 110 in a vertically stacked or height direction by an equal distance. The first pair of cable connectors 108 both have first sidewalls 112 that both lie in a first common plane. The second pair of cable connector 110 both have second sidewalls 114 that both lie in second common plane that is spaced away from and is parallel to the first common plane. The overhang 104 can include an overhang wall 104*a* to provide support for a cable conductor 14.

Figure 15:
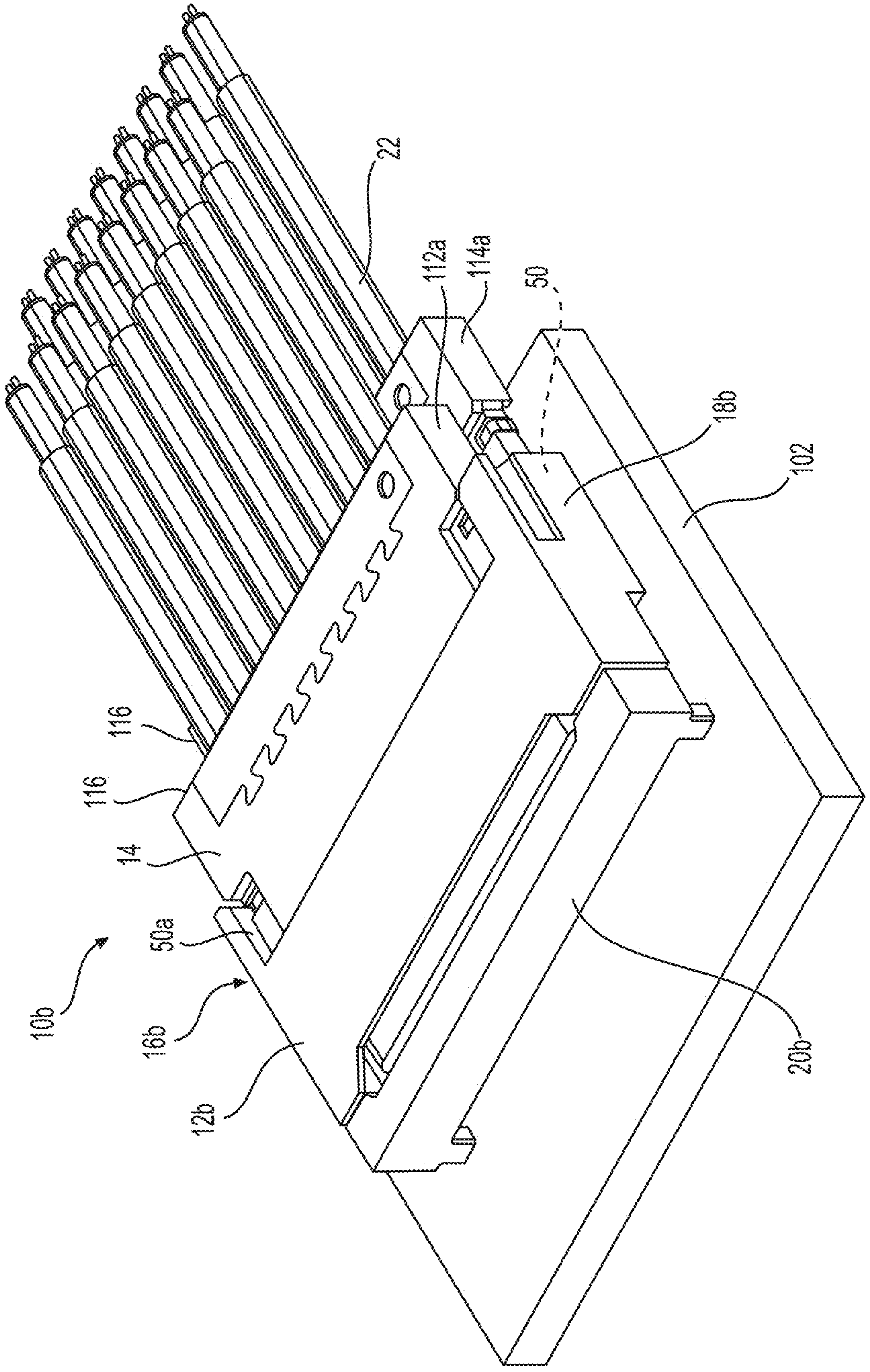
FIG. 15 is a perspective rear view of a 1-by-2 cable connector system.

FIG. 15 shows a 1-by-2 cable connector system 10B that is similar to the 1-by-4 cable connector system 10 shown in FIGS. 1-10. The cable connector system 10B can include a board connector 12B, a cable connector 14, a housing 16B that can include a first housing 18B and a second housing 20B, cables 22, and an optional mounting substrate 102. The first housing 18B can define a first slot 50 and a second slot 50*a*. The second slot 50*a* can be horizontally offset with respect to the first slot 50 in a vertically stacked or height direction, such that a first sidewall 112A of one of the two cable connectors 14 and second sidewall 114*a* of the other one of the two cable connectors 14 do not lie in a common plane. Respective first end walls 116 of the two cable connectors 14 are not coincident with one another and do not overlap one another.

Figure 16:
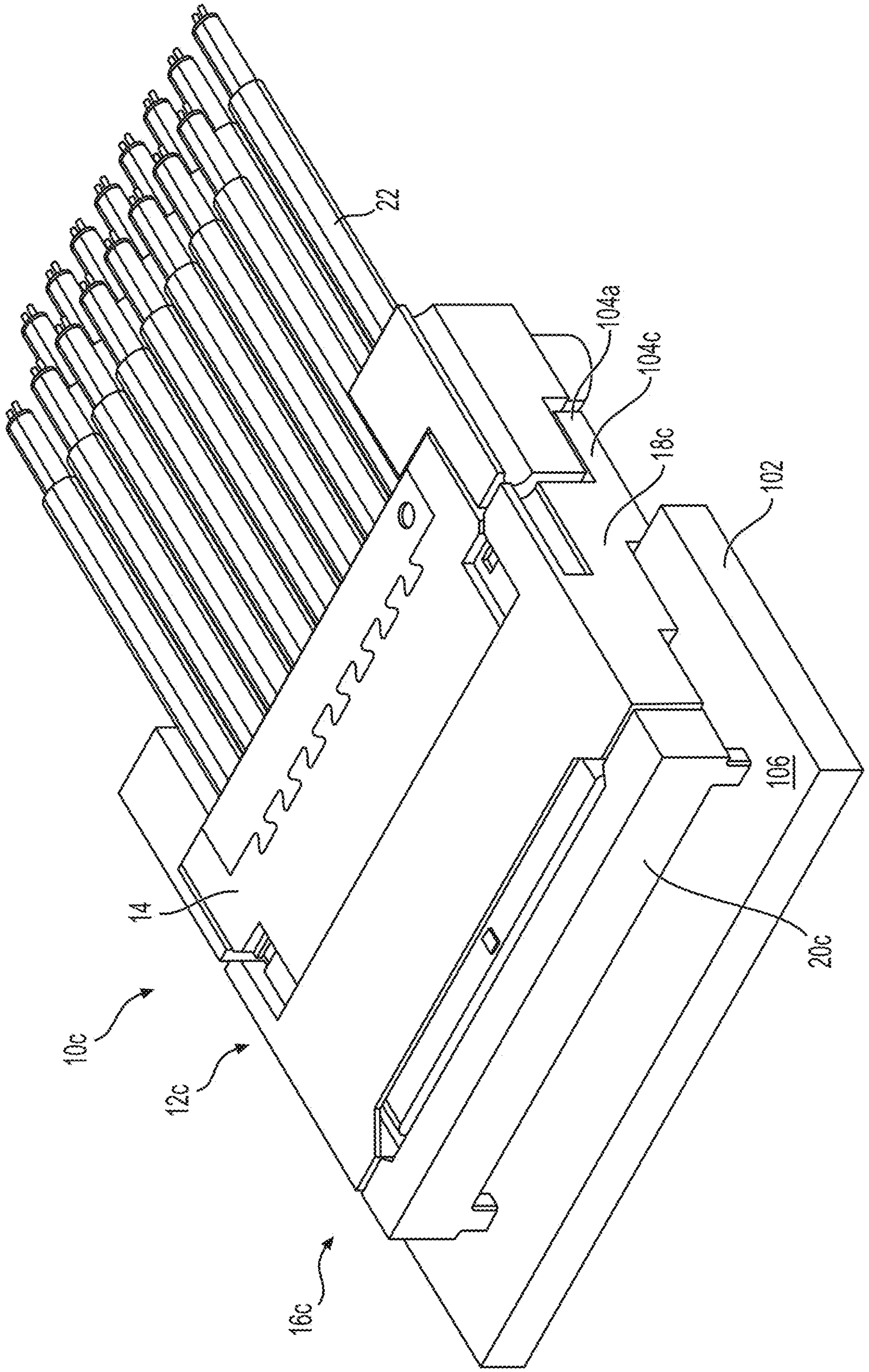
FIG. 16 is a perspective rear view of a 1-by-2 cable connector system with an overhanging board connector.

FIG. 16 shows a cable connector system 10C that is similar to the cable connector system 10B of FIG. 15, except the housing 16C, such as the first housing 18C, can define an overhang 104C. The overhang 104C can extend below the second housing 20C and a major surface 106 of a substrate 102. The overhang 104C can define an overhang wall 104*a* to help support a mating cable connector 14.

Figure 17:
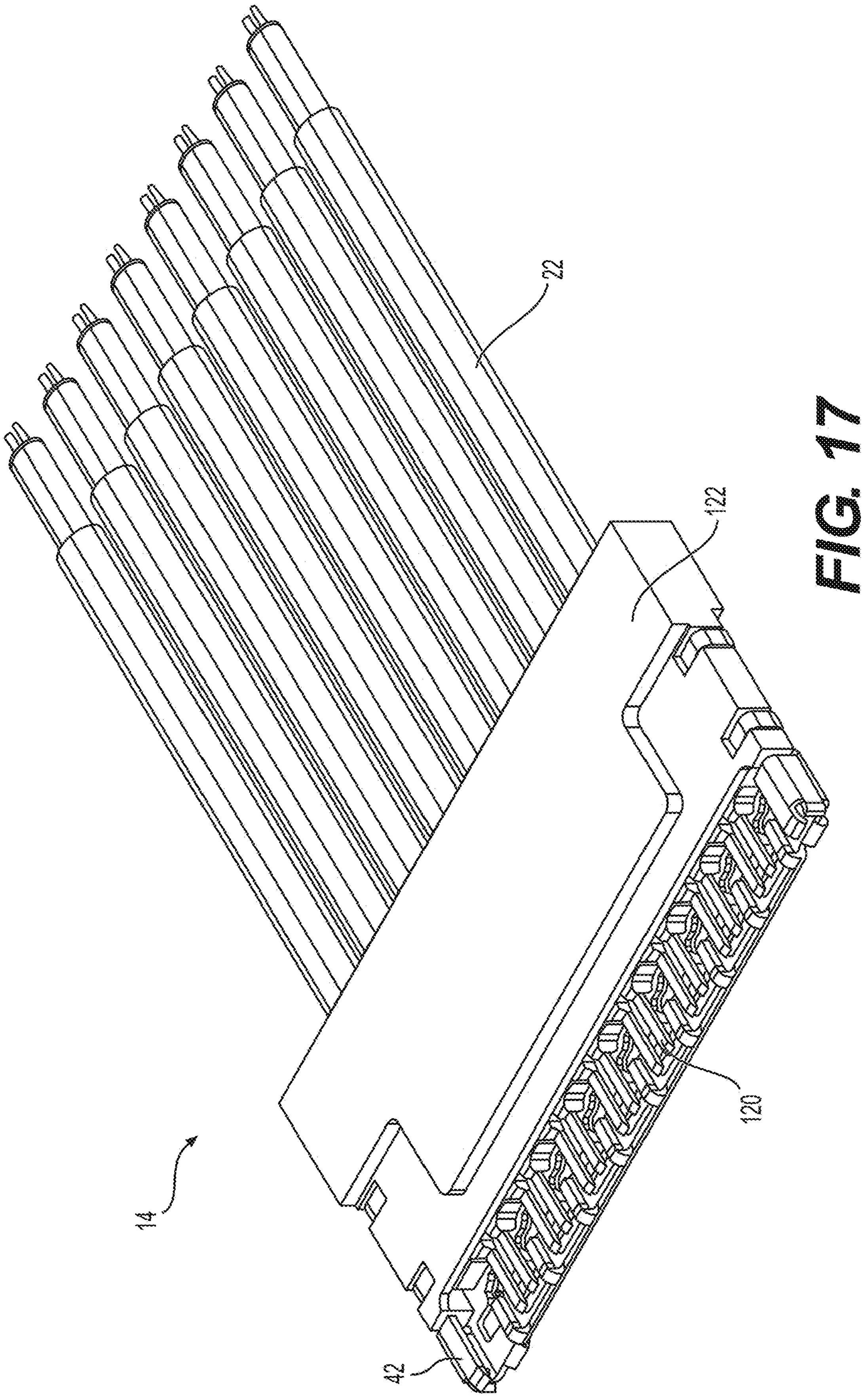
FIG. 17 is a perspective front view of a cable connector.

FIG. 17 shows a cable connector 14 that can be used with any of the board connectors 12, 12A, 12B, 12C described herein. The cable connector 14 can include cables 22, cable connector signal conductors 120, a cable connector shield 42, and a cover 122. Although FIG. 17 shows eight twin axial cables and eight signal conductor pairs 26*a*, 26*b*, any number or types of cables 22 and signal conductor pairs 26*a*, 26*b* can be used, including, for example, a coaxial cable with a single center conductor.

Figure 18:
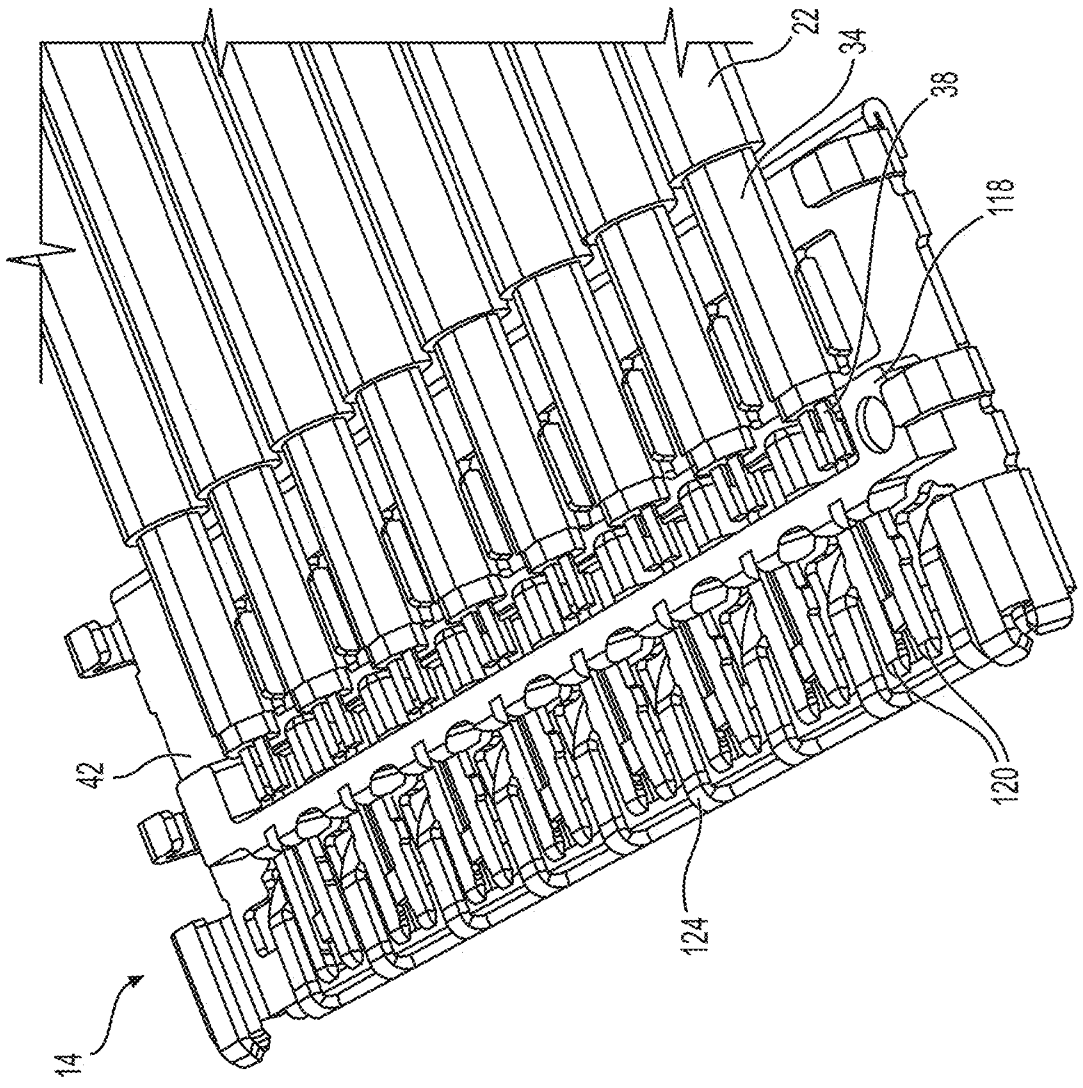
FIG. 18 is a perspective top view of the cable connector shown in FIG. 17.

As shown in FIG. 18, the cable conductors 38 of the cables 22 can be attached to respective cable connector signal conductors 120. The cable shield 34 can be electrically attached to the cable connector shield 42. A cable connector insert 118 can surround portions of the cable connector signal conductors 120 and can be attached to the cable connector shield 42. For example, the cable connector insert 118 can be manufactured by insert molding. Cable connector shield 42 can define a cantilevered shield arm 124 that is bent back over itself.

Figure 19:
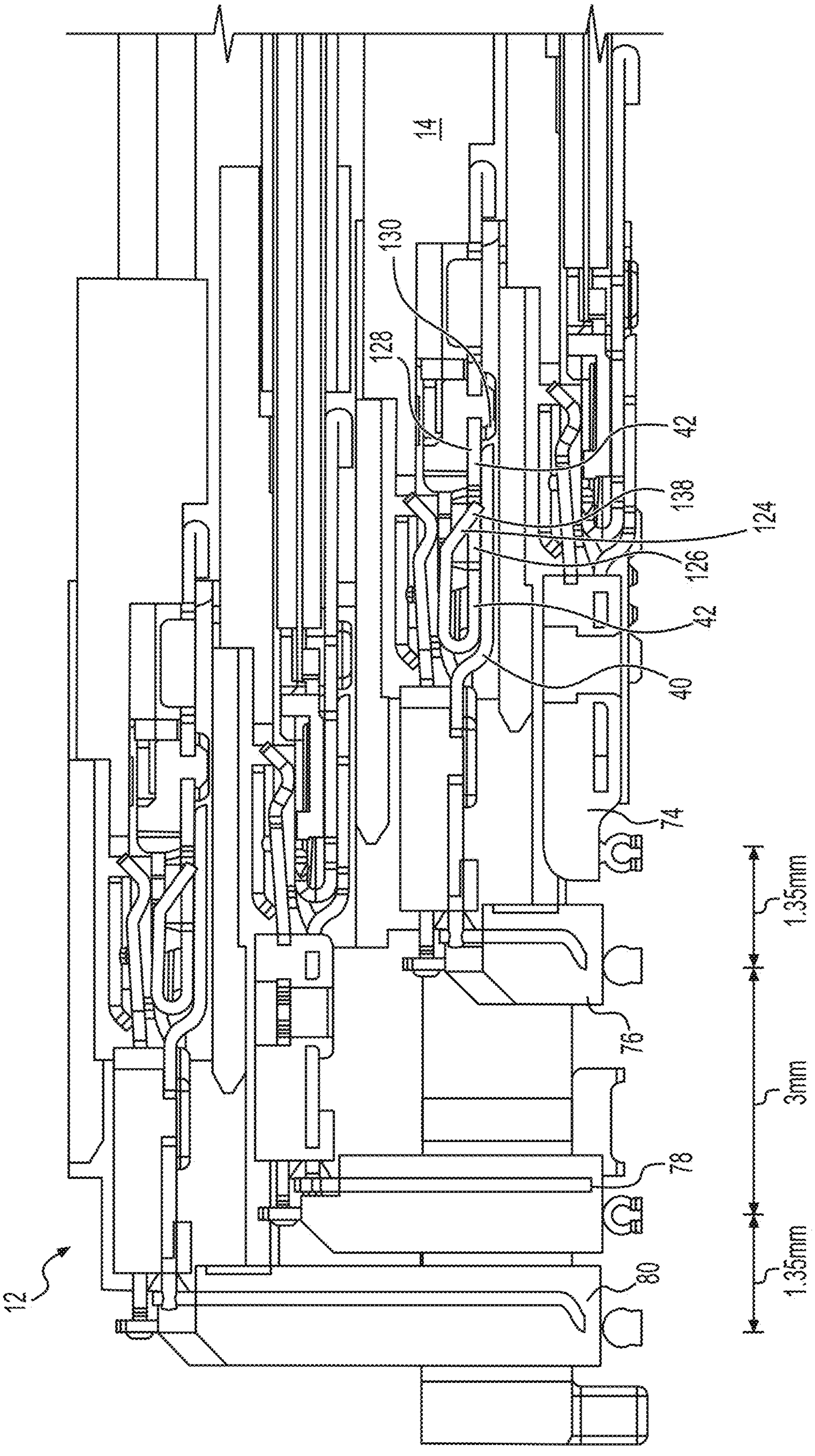
FIG. 19 is a cross-sectional side view of the cable connector system shown in FIG. 1.

FIG. 19 shows a board connector shield 40 and a cable connector shield 42 that electrically connect, physically connect, or both electrically connect and physically connect. The shield arm 124 of the cable connector shield 42 can be bent back onto itself. A shield arm mating end 138 of the shield arm 124 can extend through a corresponding hole 126 defined by the cable connector shield 42, passing through and below a first cable connector shield surface 128 and an opposed second cable connector shield surface 130 of the cable connector shield 42, which allows the shield arm 124 to electrically and/or physically contact a board connector shield 40 of the board connector 12 when the cable connector 14 is inserted into any one of board connectors 12, 12A, 12B, 12C. Spacing between the first leadframe assembly 74 and the second leadframe assembly 76 can be approximately 1.35 mm. Spacing between the second leadframe assembly 76 and the third leadframe assembly 78 can be approximately 3 mm. Spacing between the third leadframe assembly 78 and the fourth leadframe assembly 80 can be approximately 1.35 mm.

Figure 20:
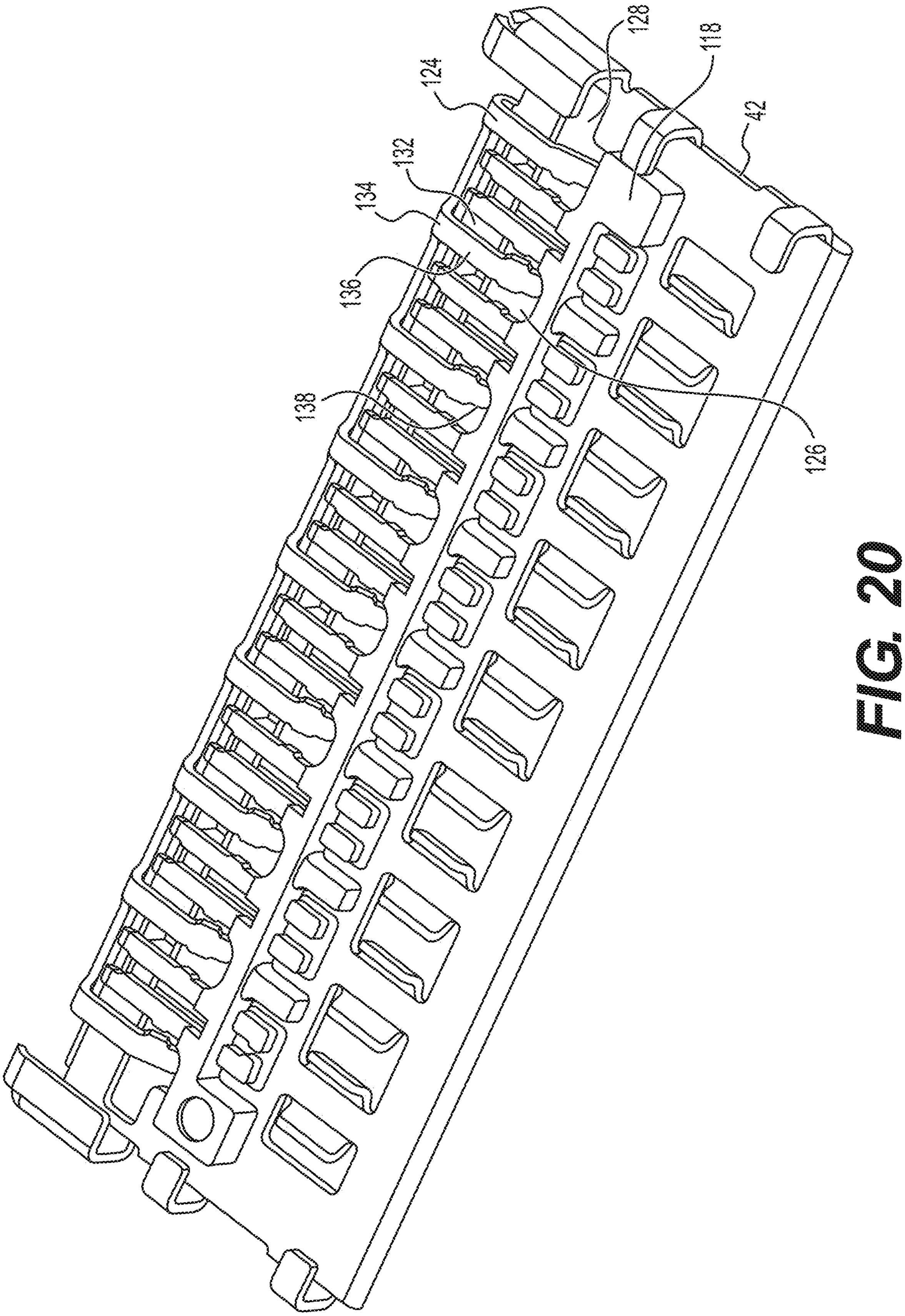
FIG. 20 is a top perspective view of a cable connector shield and insert.

The shield arm 124 of the cable connector shield 42, as well as cable connector insert 118 that includes cable connector signal conductors 120, is further shown in FIG. 20. The cable connector shield 42 can include a single sheet of electrically conductive material, such as copper, beryllium copper or other suitable material, that is formed into a unitary cable connector shield 42. The cable connector shield 42 can include a shield arm 124. The shield arm 124 can have a first shield arm portion 132. A bent or U-shaped second shield arm portion 134 can be attached to the first shield arm portion 132 and can curve in a second direction toward the cable connector shield 42. A third shield arm portion 136 can be connected to the second shield arm portion 134 and can extend in a third direction toward the cable connector shield 42 and opposite to the first shield arm 132 direction, such that a shield arm mating end 138 of the third shield arm portion 136 is received in a hole 126 defined by the cable connector shield 42. The first shield arm portion 132 of the shield arm 124 and the shield arm mating end 138 of the third shield arm portion 136 may both electrically connect and/or physically contact a board connector shield 40 of a mating connector. Bending the shield arm 124 back onto itself shortens the ground or return path when the shield arm 124 contacts or connects with a corresponding board connector shield 40 of the board connecter 12, 12A, 12B, 12C, increasing electrical performance of the cable connector 14 or the mated combination of the cable connector 14 and the board connector 12. The third shield arm portion 136 and the associated shield arm mating end 138 flexes in a direction away from the first cable connector shield surface 128 of the board connector shield 40, creating a normal force.

Figure 21:
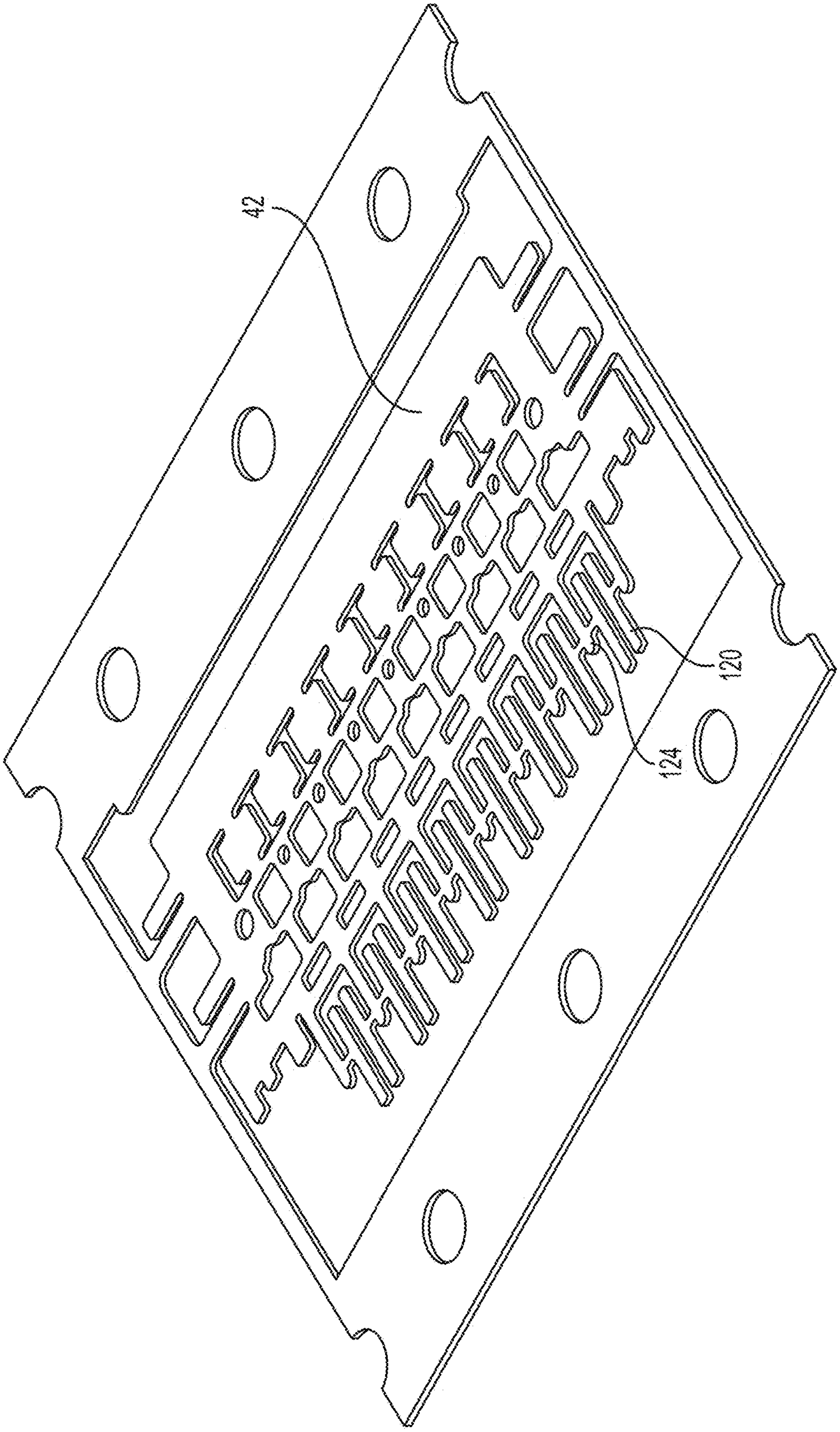
FIG. 21 is a perspective top view of a cable connector shield prior to bending.
Figure 22:
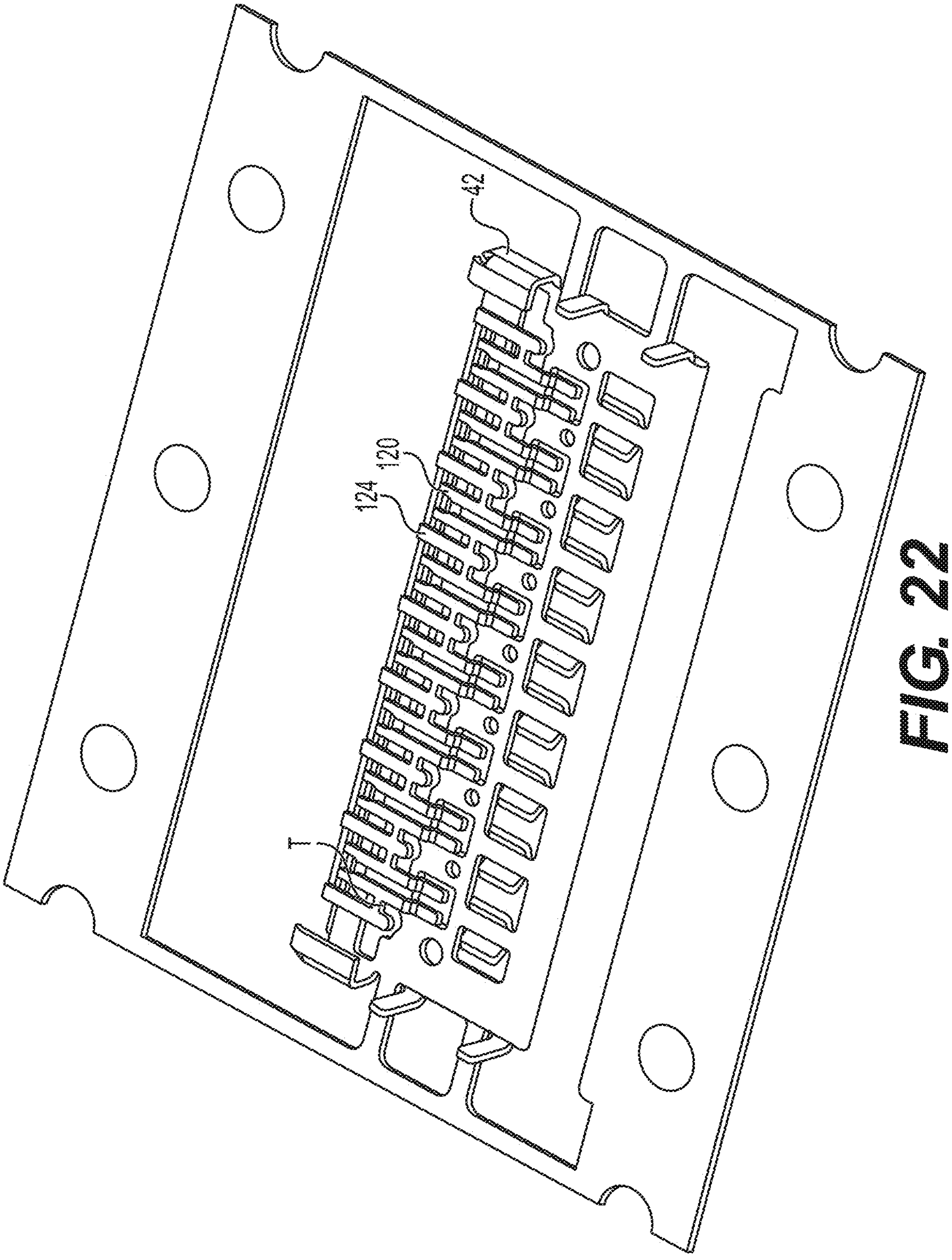
FIG. 22 is a top perspective view of a cable connector shield worked by a progressive die
Figure 23:
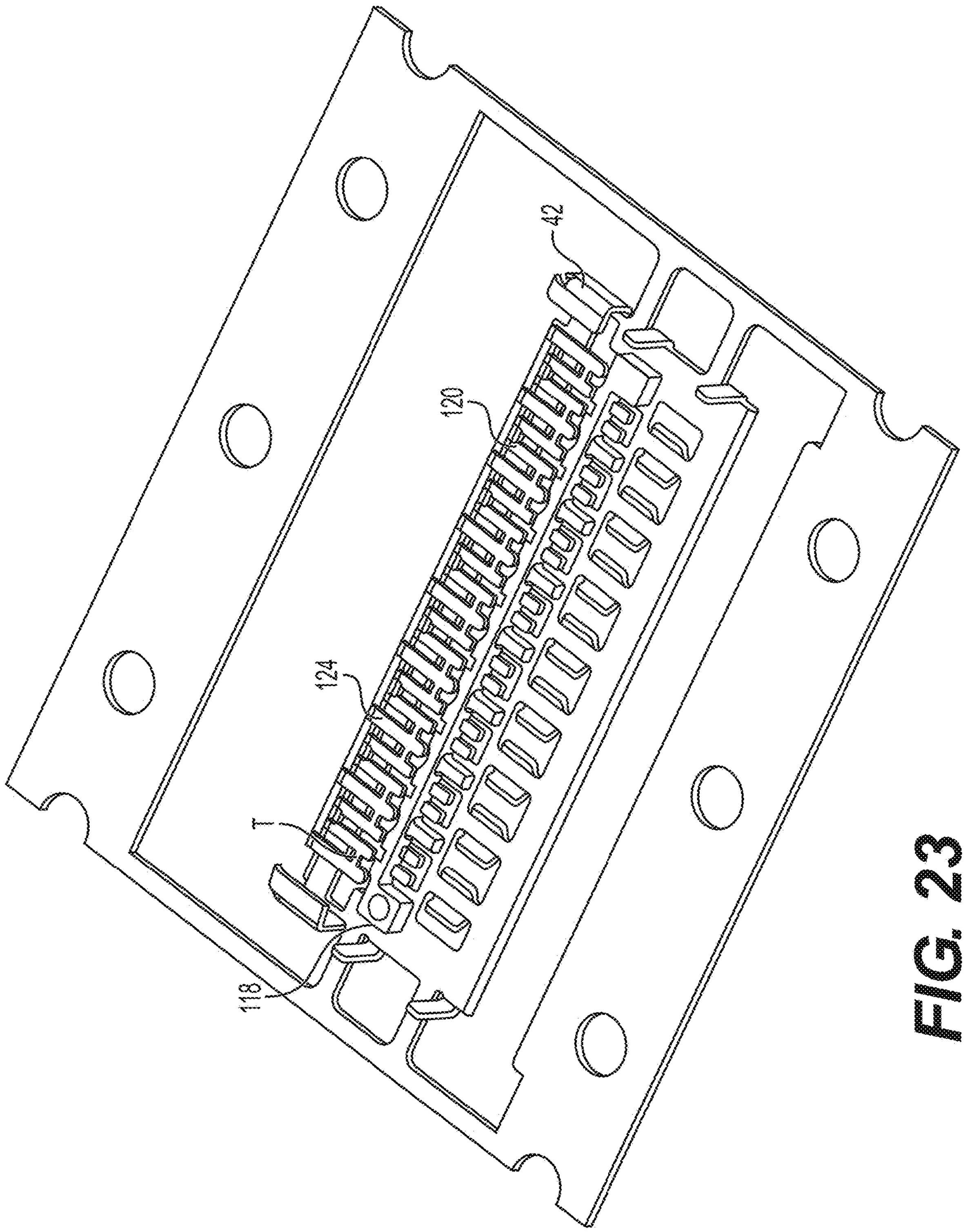
FIG. 23 is a top perspective view of a cable connector shield worked by a progressive die.
Figure 24:
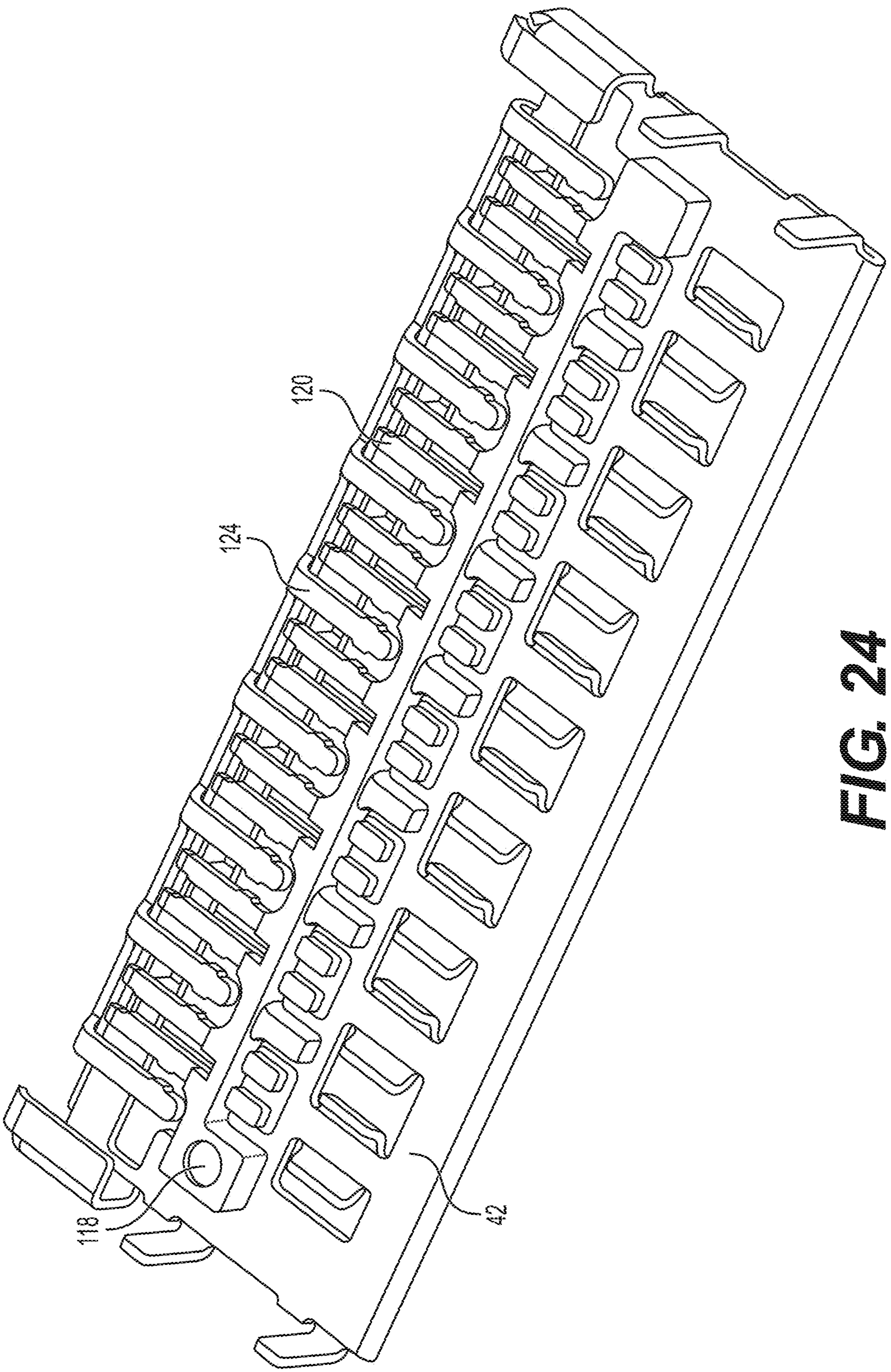
FIG. 24 is a top perspective view of a cable connector shield worked by a progressive die.
Figure 25:
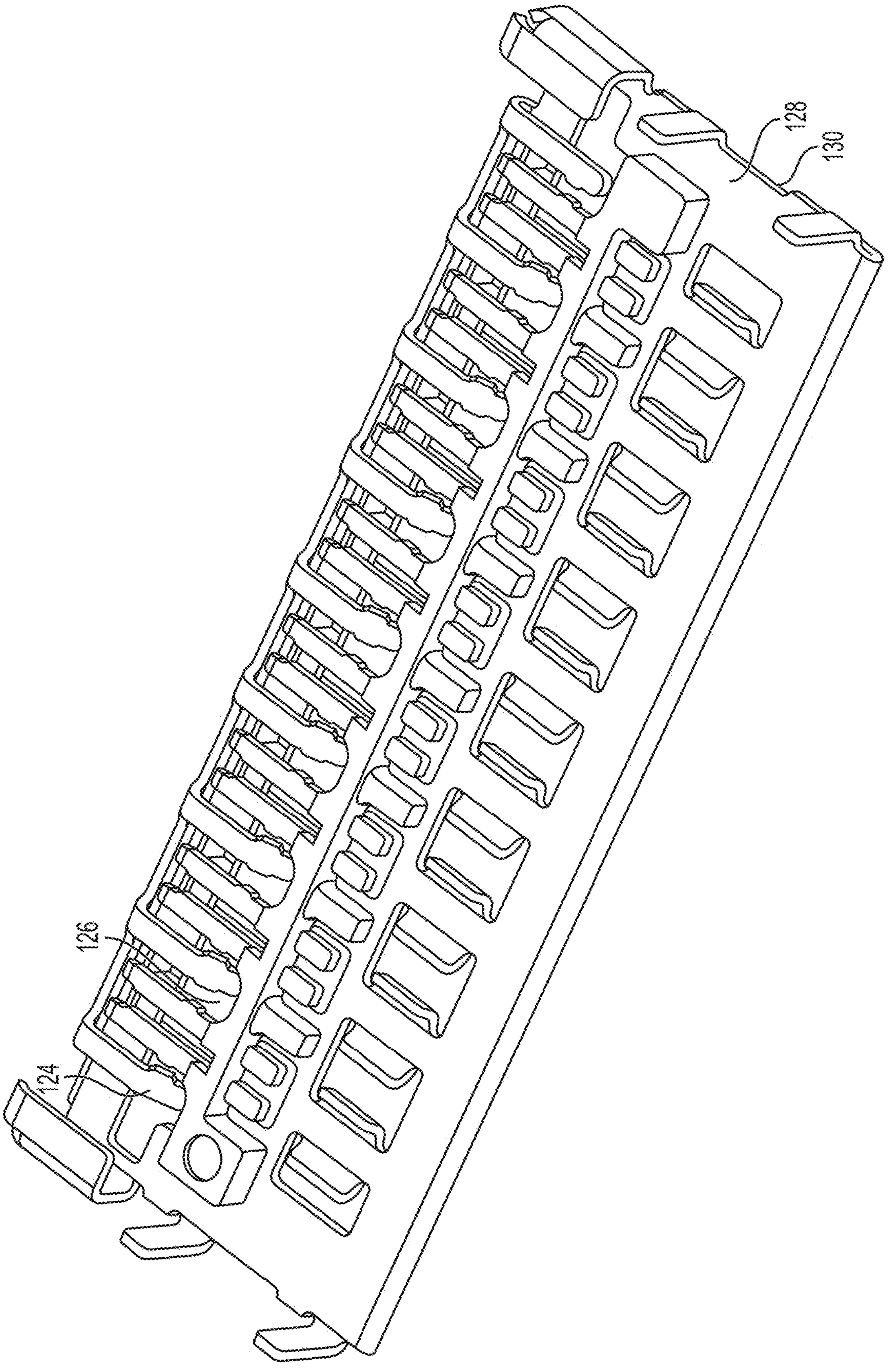
FIG. 25 is a top perspective view of a cable connector shield worked by a progressive die.

FIGS. 21-25 show a method of manufacturing a cable connector shield 42, cable connector signal conductors 120 and shield arms 124 from a single stamping of material. FIG. 21 shows a flat stamping cable connector shield 42 that can include respective cable connector signal conductors 120 and respective shield arms 124. The cable connector shield 42, cable connector signal conductors 120 and shield arms 124 are all formed from stamping a single metal sheet. Any suitable metal sheet can be used. In FIG. 22, a progressive die is used to bend and shape portions of the flat stamping to further create the cable connector shield 42, cable connector signal conductors 120 and shield arms 124. Cable connector signal conductors 120 can be temporarily held in place with removable tie bars T. In FIG. 23, insert molding can form the cable connector insert 118, which allows the tie bars T to be removed. Once the tie bars T are removed, the cable connector insert 118 can electrically isolate the cable connector signal conductors 120 from the cable connector shield 42 and the shield arms 124. The outer frame can also be removed when the tie bars T are removed. As shown in FIG. 24, removing the tie bars T disconnects the cable connector signal conductors 120 from the shield arms 124 and the rest of the cable connector shield 42 so that the cable connector signal conductors 120 are electrically isolated from the cable connector shield 42. In FIG. 25, the shield arms 124 can be bent through corresponding holes 126 defined by the first cable connector shield surface 128 and the opposed second cable connector shield surface 130.

Figure 26:
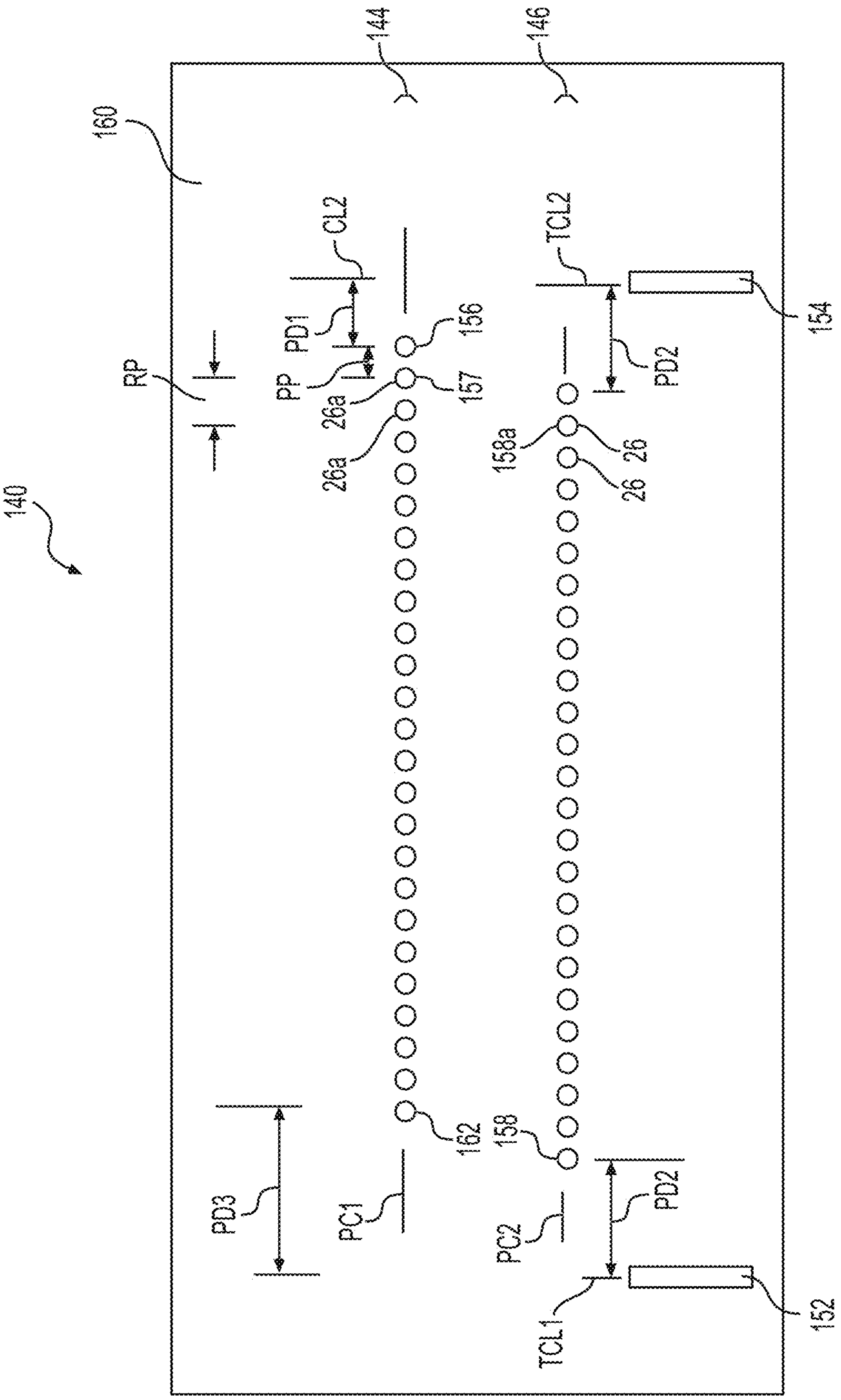
FIG. 26 is a top view of a first substrate footprint.
Figure 27:
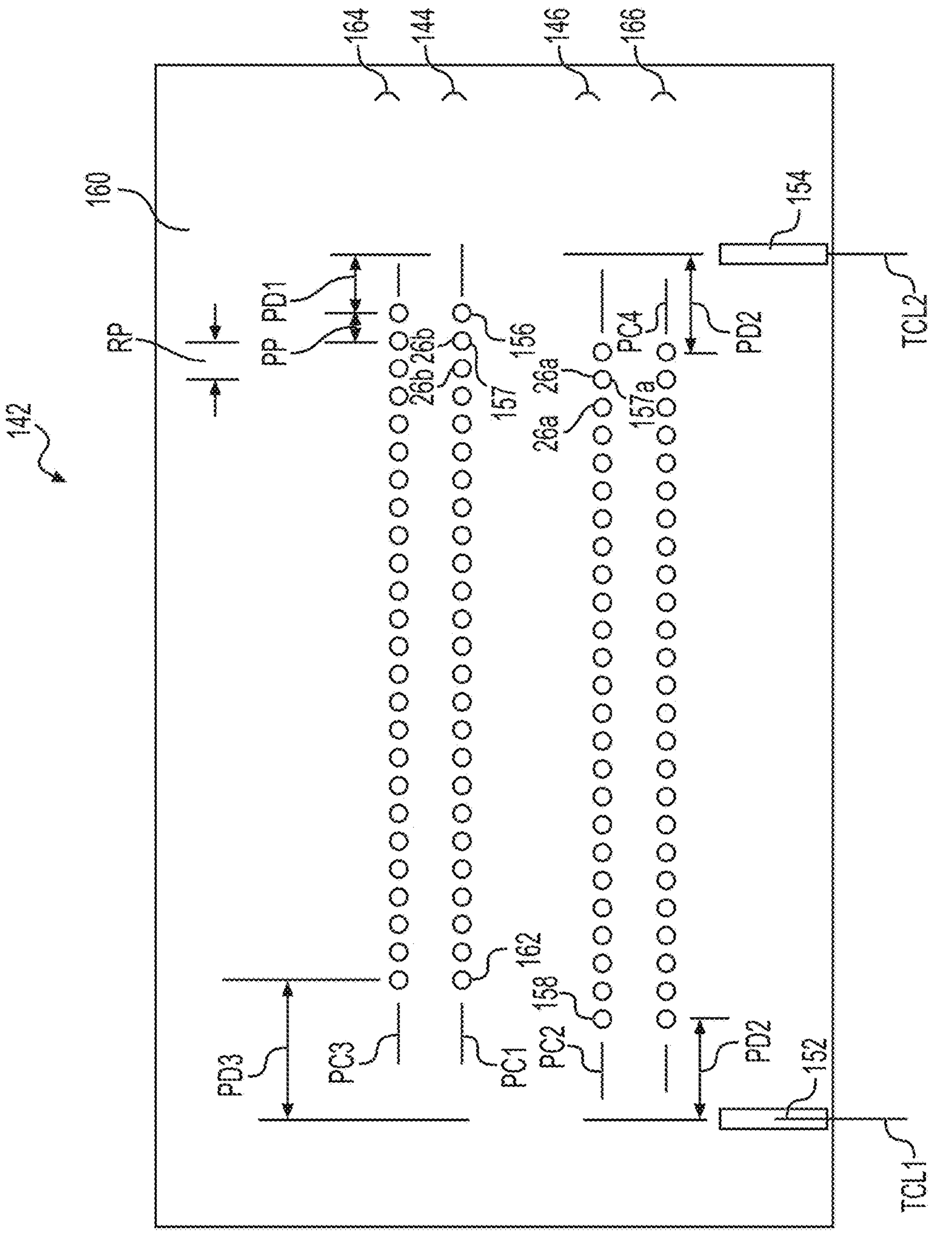
FIG. 27 is a top view of a second substrate footprint.

FIGS. 26 and 27 show substrates with substrate footprints that correspond to respective connector footprints of respective board connectors 12, 12A, 12B, 12C. For 1-by-2 board connectors 12B, 12B, FIG. 26 shows a generic mounting substrate 160, such as a die substrate, expansion card substrate, or host substrate that defines a first substrate footprint 140. The first substrate footprint 140 can include a first linear array of pads 144. The first linear array of pads 144 can extend along a first pad centerline PC1. A second linear array of pads 146 can extend along a second pad centerline PC2. The first pad centerline PC1 can be positioned parallel to the second pad centerline PC2.

In this embodiment, one of the pads of the first linear array of pads 144, such as a pad 157 that receives a corresponding one of signal conductors 26, can be horizontally offset from a corresponding one of the pads of the second linear array of pads 146, such as pad 157*a* that receives a corresponding one of signal conductors 26*a*. The horizontal offset can be by no pad row pitch RP (i.e., no offset), a partial pad row pitch RP1 that is less than a full pad row pitch RP, a full pad row pitch RP, more than a pad row pitch RP, a full pad pitch PP, at least two pad pitches PP, at least three pad pitches PP, more than two pad pitches PP, or more than three pad pitches PP. A pad row pitch RP can be measured from a centerline of a pad in the first linear array of pads 144 and a corresponding pad in the second linear array of pads 146. A pad pitch PP can be a distance between centerlines of two adjacent pads in the respective first or second linear arrays 144, 146. For pad row pitch RP, corresponding pads can have the same position number, left to right, in each of the first and second linear arrays of pads 144, 146. For example, corresponding pads can each be the last or second to last pads 157, 157*a*, left to right, in each of the first and second linear arrays of pads 144, 146.

A first weld tab land 152 and a second weld tab land 154 can be positioned on the generic mounting substrate 160, adjacent to the second linear array of pads 146. The first weld tab land 152 can have a first weld tab centerline TCL1, and the second weld tab land 154 can have a second weld tab centerline TCL2. The first weld tab centerline TCL1 and the second weld tab centerline TCL2 can each be positioned parallel to each other and perpendicular to the first pad centerline PC1 and the second pad centerline PC2. A first pad distance PD1, measured from a center of end pad 156 in the first linear array of pads 144 to the second weld tab centerline TCL2, is less than a second pad distance PD2 measured from a center of the opposite end pad 158 in the second linear array of pads 146 to the first weld tab centerline TCL1. A third pad distance PD3, measured between the other end pad 162 in the first linear array of pads 144 and the first weld tab centerline TCL1, can be greater than the first pad distance PD1 or the second pad distance PD2. The first pad centerline PC1 and the second pad centerline PC2 do not intersect the first weld tab land 152 or the second weld tab land 154.

For a 1-by-4 board connector 12, 12A, as shown in FIG. 27, a second substrate footprint 142 is similar to the first substrate footprint 140 discussed above. The second substrate footprint 142 can be defined on a generic mating substrate 160 and can include a first linear array of pads 144. The first linear array of pads 144 can extend along a first pad centerline PC1. A second linear array of pads 146 can extend along a second pad centerline PC2. The first pad centerline PC1 can be positioned parallel to the second pad centerline PC2.

One of the pads of the first linear array of pads 144, such as a pad 157 that receives a corresponding one of signal conductors 26*b*, can be horizontally offset from a corresponding one of the pads of the second linear array of pads 146, such as pad 157*a* that receives a corresponding one of signal conductors 26*a*, by no pad row pitch RP (i.e., no offset), a partial pad row pitch RP that is less than a full row pitch RP, a full pad row pitch RP, more than a pad row pitch RP, a full pad pitch PP, at least two pad pitches PP, at least three pad pitches PP, more than two pad pitches PP, or more than three pad pitches PP. A pad row pitch RP can be the distance from a centerline of a pad in the first linear array of pads 144 and a corresponding pad in the second linear array of pads 146. A pad pitch PP can be the distance between centerlines of two adjacent pads in the respective first or second linear arrays 144, 146. For pad row pitch RP, corresponding pads can have the same position number, left to right, in each of the first and second linear arrays of pads 144, 146. For example, corresponding pads can each be the last or second to last pads 157, 157*a*, left to right, in each of the first and second linear arrays of pads 144, 146.

A first weld tab land 152 and a second weld tab land 154 can be positioned on the generic mounting substrate 160. The first weld tab land 152 can have a first weld tab centerline TCL1, and the second weld tab land 154 can have a second weld tab centerline TCL2. The first weld tab centerline TCL1 and the second weld tab centerline TCL2 can each be positioned parallel to each other and perpendicular to the first pad centerline PC1 and the second pad centerline PC2. A first pad distance PD1, measured from a center of end pad 156 in the first linear array of pads 144 to the second weld tab centerline TCL2, is less than a second pad distance PD2 measured from a center of the opposite end pad 158 in the second linear array of pads 146 to the first weld tab centerline TCL1. A third pad distance PD3, measured between the other end pad 162 in the first linear array of pads 144 to the first weld tab centerline TCL1, can be greater than the first pad distance PD1 or the second pad distance PD2. A third linear array of pads 164 can extend along a third pad centerline PC3 that extends parallel to the first pad centerline PC1. A fourth linear array of pads 166 can extend along a fourth pad centerline PC4 that extends parallel to the first pad centerline PC1. The first linear array of pads 144 can be positioned with no row pitch offset between the first linear array of pads 144 and the third linear array of pads 164. The second linear array of pads 146 can be positioned with no row pitch offset between the second linear array of pads 146 and the fourth linear array of pads 166. The first pad centerline PC1, the second pad centerline PC2, the third pad centerline PC3 and the fourth pad centerline PC4 do not intersect the first weld tab land 152 or the second weld tab land 154.

Figure 28:
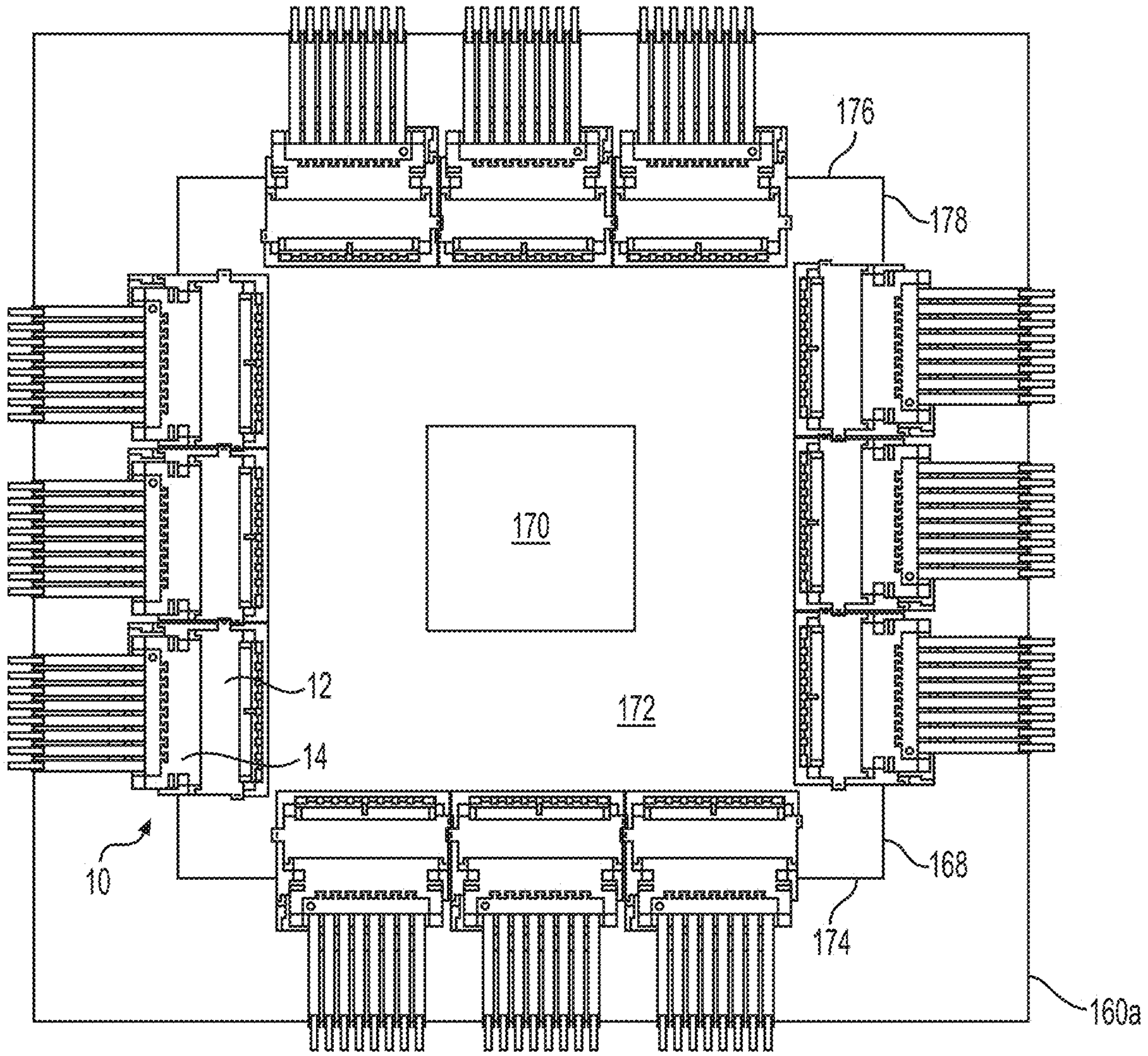
FIG. 28 is a top view of a die package mounted to a host substrate.

FIG. 28 shows a die substrate 168, a die 170 mounted to the die substrate 168, and a first group of a plurality of cable connector systems 10, 10A, 10B, 10C. Each cable connector system can include a board connector 12 and a corresponding cable connector 14. The die 170 can be a chip and can be included on a first die substrate surface 172 of the die substrate 168. The combination of the die substrate 168 and the die 170 can be referred to as a die package 174. The first die substrate surface 172 may include optional serializer/deserializer chips (not shown). The board connectors 12 and the cable connectors 14 can be in electrical contact with the die 170. Placing the connector systems 10 directly on the die package 174 helps to eliminate trace losses from the die package 174 to a generic mounting substrate 160A.

The die substrate 168 can be any suitable size, such as an approximate 85-mm-by-85-mm printed circuit board, measured along two intersecting first and second die edges 176, 178 of the die substrate 168. The die substrate 168 can be other sizes. The die package 174 is preferably square, but does not have to have sides of equal lengths and can have other shapes. The larger the area of the die substrate 168, the more connector systems 10, 10A, 10B, 10C can be added to the first die substrate surface 172.

Figure 29:
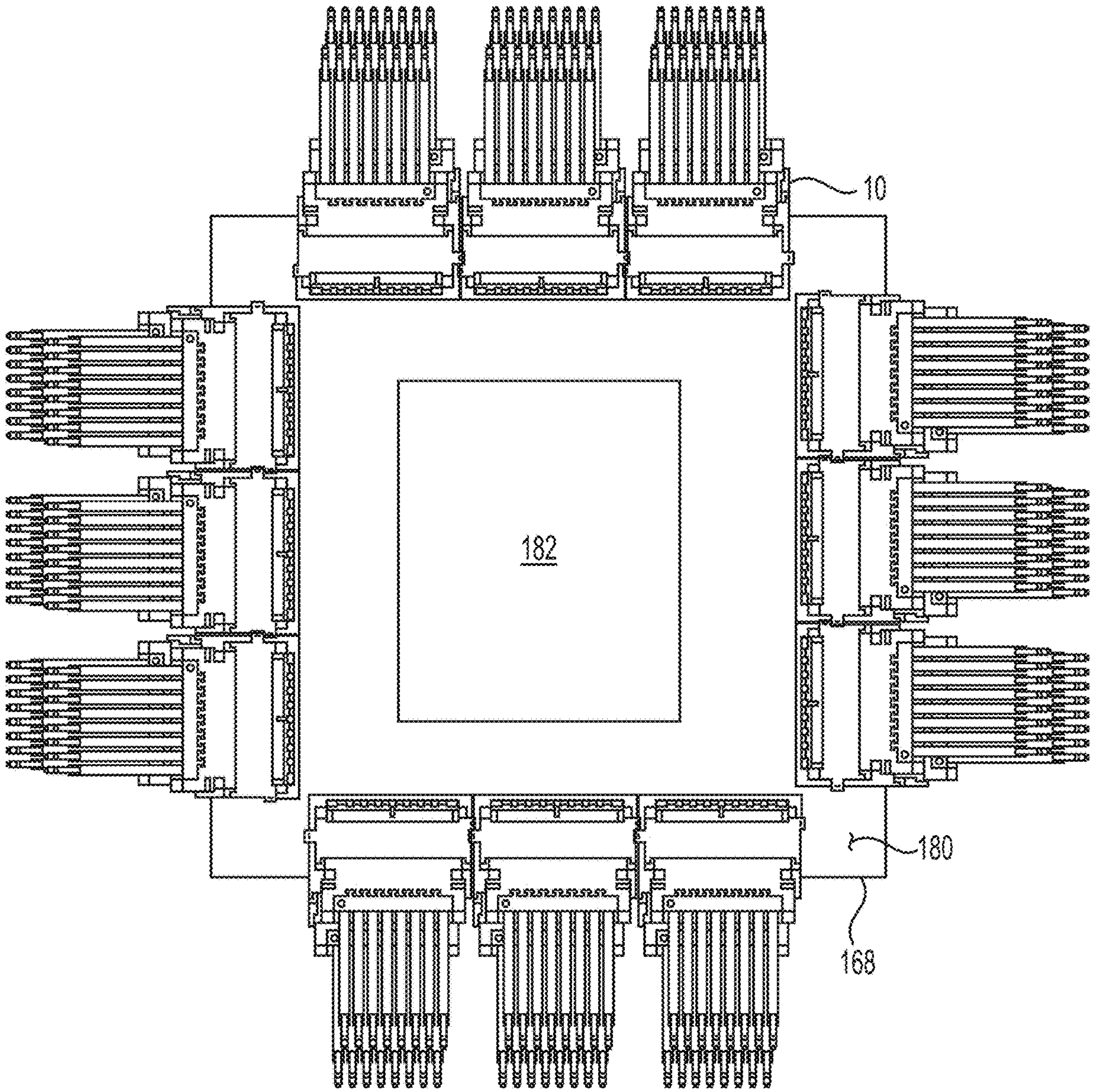
FIG. 29 is a bottom view of the die package populated with cable connector systems.

FIG. 29 shows a second die substrate surface 180 of the die substrate 168. The second die substrate surface 180 can include a second group of cable connector systems 10, 10A, 10B, 10C, each electrically connected to the die 170 (FIG. 28). The second die substrate surface 180 can also define a pin or pad field 182 that can electrically connect the die 170 (FIG. 28) with a power source, compression connector, pin connector, interposer, etc. (not shown). The compression or pin connector can exclusively include low speed, power, control, or other sideband signals to the die 170 or can include high-speed signals as well. The second die substrate surface 180 of the die package 174 can include serializer/deserializer chips, such as 16-by-16 lane SERDES chips.

As shown in FIGS. 28 and 29, a die package 174 can therefore include a die substrate 168 that defines a first die substrate surface 172, an opposed second die substrate surface 180, a die 170 included on the first die substrate surface 172, cable connector systems 10, 10A, 10B, 10C included on the first die substrate surface 172, and cable connector systems 10, 10A, 10B, 10C included on the second die substrate surface 180. Each cable connector system 10, 10A, 10B, 10C can include a board connector 12 included on the first die substrate surface 172, a board connector 12 included on the second die substrate surface 180, and a cable connector 14 releasably connected to each of the board connectors 12.

The board connectors 12 and the cable connectors 14 can each include one, two, three, or four rows of four differential signal pairs, or any other number of rows, contacts, or differential pairs. For example, each board connector 12 can include eight differential signal pair per slot, and each cable connector can include eight differential signal pairs, or a total of eight, sixteen, twenty-four, or thirty-two 56 GHz NRZ or 112 GHz PAM4 capable differential signal pairs per cable connector system 10, 10A, 10B, 10C. As shown on the 85-mm-by-85-mm die package 174, twelve two-row cable connector systems 10 (FIGS. 16 and 17) can provide at least one hundred and ninety-two differential signal pairs on the first die substrate surface 172 of the die package 174 and at least one-hundred and ninety-two differential signal pairs on the opposite second die substrate surface 180 of the die package 174. Twelve four-row cable connector systems 10 (FIGS. 1-10 and 12-14) positioned on the first die substrate surface 172 can provide at least three hundred and eighty-four differential signal pairs on the first die substrate surface 172 of the die package 174 and at least three hundred and eighty-four differential signal pairs on the second die substrate surface 180 of the die package 174. Any of the cable connector systems can be positioned on a substrate other than a die substrate 168.

Cables 22 attached to the cable connectors 14 can have a maximum diameter of 33, 34 or 35 or 36 gauge. The board connector 12 and the cable connector 14 can both be configured not to receive an edge card. A 2-by-1 board connector 12, 12A, 12B or cable connector 14 has modeled insertion loss between 0 dB and −1 dB through frequencies up to 25 GHz, modeled insertion loss between 0 dB and −1 dB through frequencies up to 30 GHz, and modeled insertion loss between 0 dB and −2 dB through frequencies up to 40 GHz. Differential return loss can be between −20 dB and −60 dB through frequencies up to 20 GHz and between −10 dB and −60 dB through frequencies up to 30 GHz. Differential far end crosstalk (FEXT) powersum is modeled between −30 dB and −100 dB through frequencies up 40 GHz and between −20 dB and −100 dB through frequencies up to 90 GHz. Modeled differential near end crosstalk (NEXT) is between −40 dB and −100 dB through frequencies up to 35 GHz and between −30 dB and −100 dB through frequencies up to 50 GHz.

A 4-by-1 board connector 12, 12A, 12B or cable connector 14 has modeled insertion loss between 0 dB and −2 dB through frequencies up to 15 GHz, between 0 dB and −3 dB through frequencies up to 20 GHz, and between 0 dB and −5 dB through frequencies up to 40 GHz. Differential return loss is between −20 dB and −60 dB through frequencies up to 10 GHz and between −10 dB and −60 dB through frequencies up to 50 GHz. Differential far end crosstalk (FEXT) powersum is modeled between −30 dB and −100 dB through frequencies up to 40 GHz and between −20 dB and −100 dB through frequencies up to 60 GHz. Modeled differential near end crosstalk (NEXT) is between −40 dB and −100 dB through frequencies up to 40 GHz and between −30 dB and −100 dB through frequencies up to 50 GHz. Date rata is approximately equal to two times the frequency, so a frequency of 20 GHz approximately equals a data rate of 40 Gbits/sec, a frequency of 30 GHz approximately equals a data rate of 60 Gbits/sec, a frequency of 40 GHz approximately equals a data rate of 80 Gbits/sec, etc.

Figure 30:
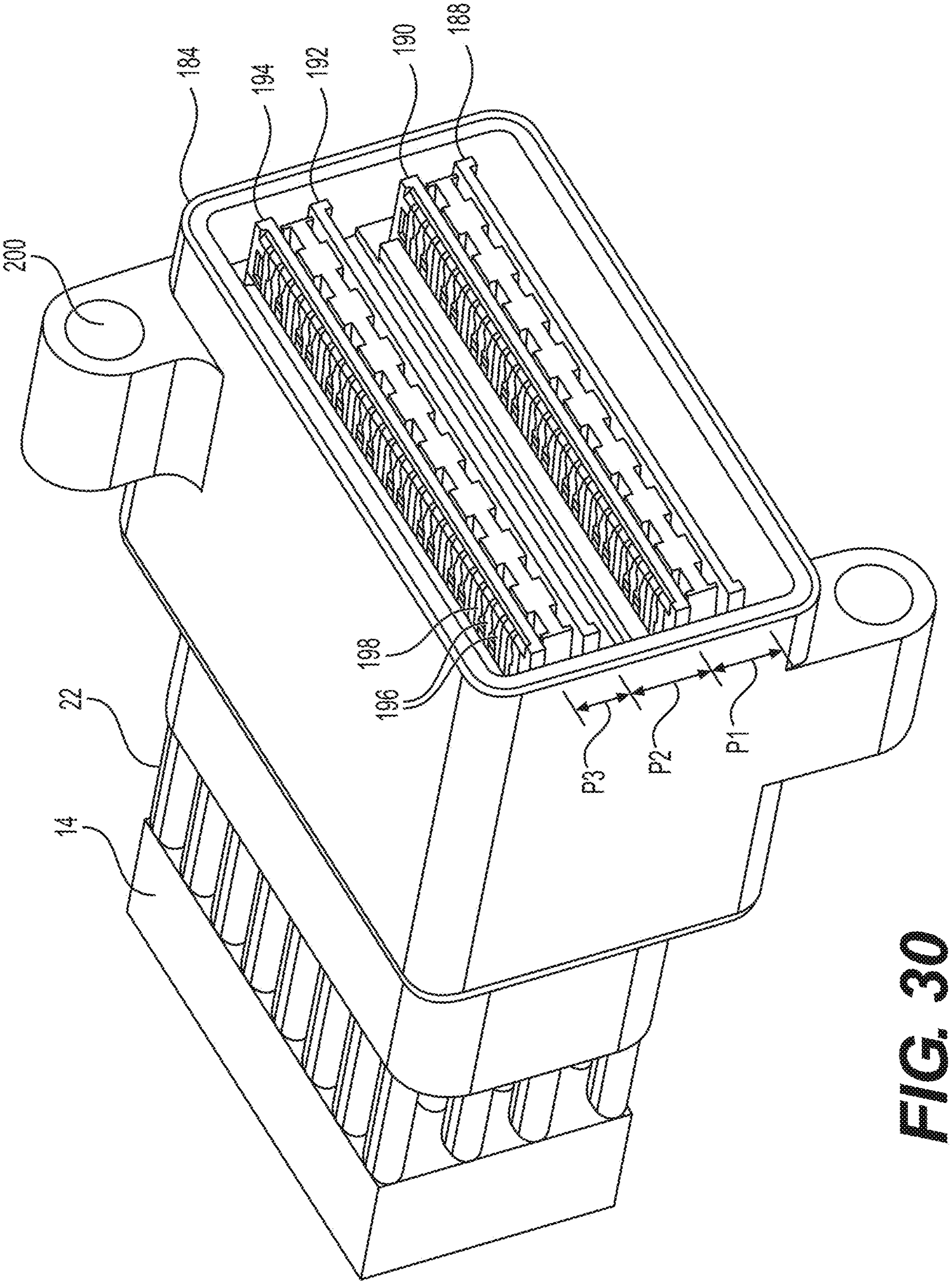
FIG. 30 is a perspective side view of a panel I/O connector.

Each cable connector 14 can be terminated with another connector, such as a panel I/O connector 184, board connector, etc. As shown in FIG. 30, a panel I/O connector 184 can be a modified ACCELERATE I/O connector. Standard ACCELERATE connectors are commercially available from SAMTEC, Inc. A modified ACCELERATEC I/O connector can include 33 AWG, 34 AWG, 35 AWG, or 36 AWG cables 22. Cables with other gauges are also possible, including, for example, 26 AWG, 27 AWG, 28 AWG, 29 AWG, 30 AWG, 31 AWG, 32 AWG, and 33 AWG.

A panel I/O connector 184 can include first, second, third, and fourth rows 188, 190, 192, 194 of electrical conductors, such as eight I/O differential signal pairs 196 and grounds 198 arranged in a S-S-G or S-S-G-G configuration. A S-S-G-G configuration can reduce signal density. The first row 188 and the second row 190 can be spaced apart by a first pitch P1 of about 2.2 mm, the second row 190 and the third row 192 can be spaced apart by a second pitch P2 of about 3 mm, and the third row 192 and the fourth row 194 can be spaced apart by a third pitch P3 of about 2.2 mm. Electrical conductors can be on a 0.635-mm pitch. Panel fasteners 200 can be used to affix the panel I/O connector 184 to a panel, such as the 1 RU panel 202 shown in FIG. 32. Cables attached to respective differential signal pairs 196 and grounds can terminate to a respective cable connector 14.

Figure 31:
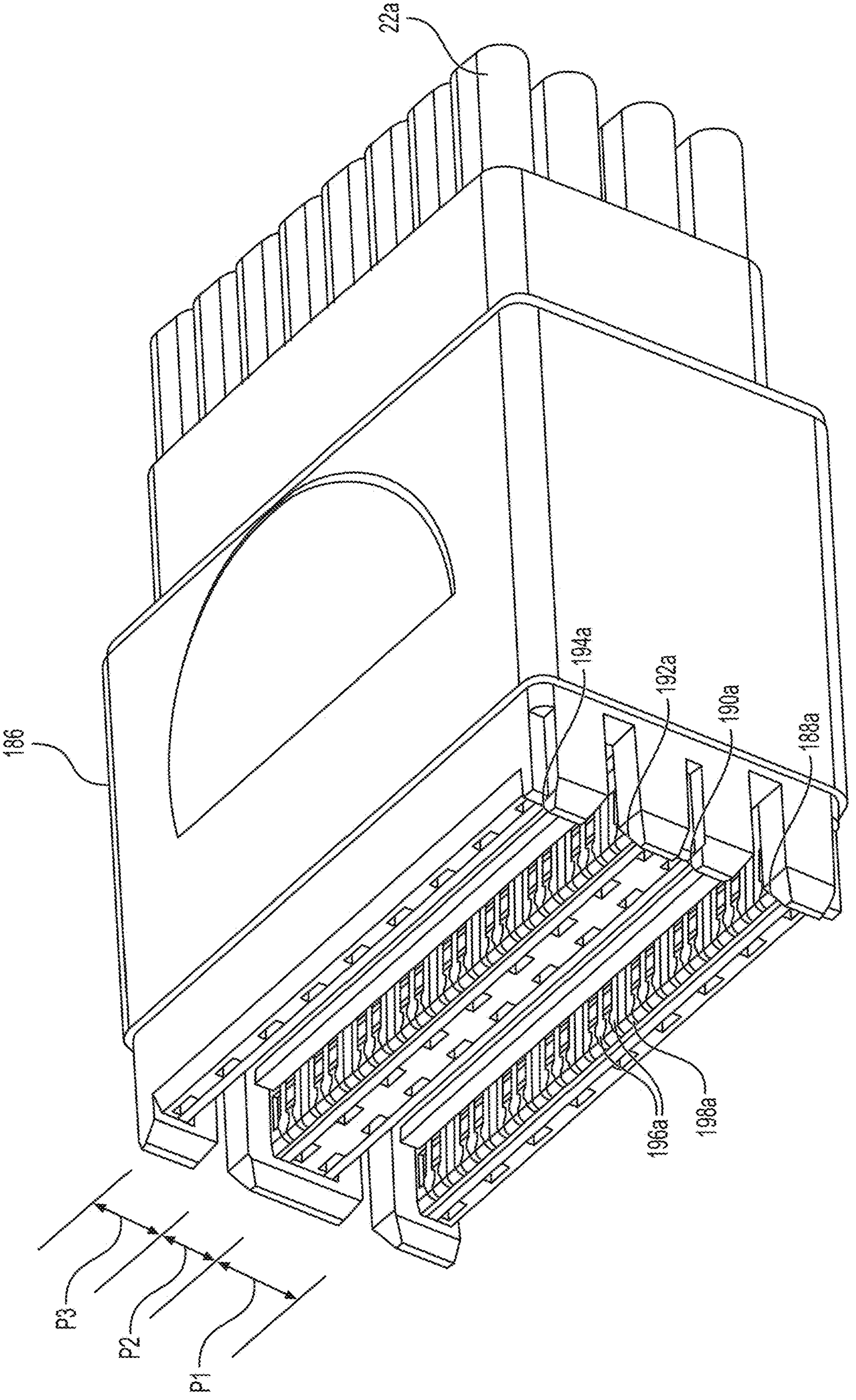
FIG. 31 is a perspective side view of an external cable connector.

FIG. 31 shows an external cable connector 186 that can mate with a panel I/O connector 184 of FIG. 30. The external cable connector 186 of FIG. 31 can include first, second, third, and fourth rows 188*a*, 190*a*, 192*a*, 194*a* of electrical contacts, such as eight I/O differential signal pairs 196*a* and grounds 198*a* arranged in a S-S-G or S-S-G-G configuration. A S-S-G-G configuration can reduce signal density. The first row 188*a* and the second row 190*b* can be spaced apart by a first pitch P1 of about 2.2 mm, the second row 190*a* and the third row 192*a* can be spaced apart by a second pitch P2 of about 3 mm, and the third row 192*a* and the fourth row 194*a* can be spaced apart by a third pitch P3 of about 2.2 mm. Electrical conductors can be on an about 0.635-mm pitch. Cables 22 can be electrically connected to the respective differential signal pairs 196 and grounds 198*a*.

Figure 32:
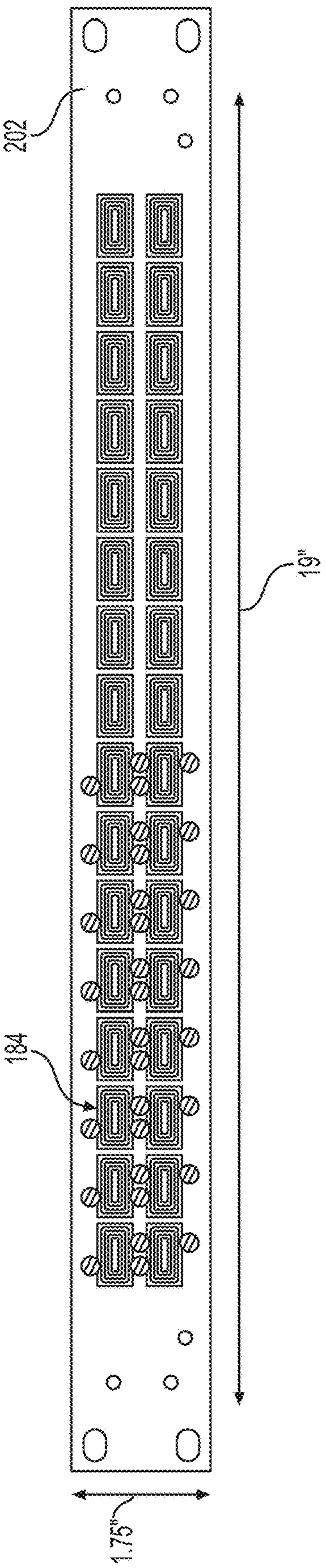
FIG. 32 is a front view of a 1RU panel.

FIG. 32 shows a surface of a 1 RU panel 202 populated with panel I/O connectors 184. At least thirty-two panel I/O connectors 184 can fit within the area of a 1 RU panel, which is approximately 1.75 inches by approximately 19 inches, or approximately 29.75 inches$^2$, or approximately 214 cm$^2$.

Embodiments of the present invention can pass or fit at least two-hundred and fifty-seven, at least two-hundred and eighty-nine, at least three hundred, at least four hundred, and at least five hundred 56 GHz NRZ or 112 GHz PAM4 differential signal pairs through a 1 RU panel area. In a 1-by-4 configuration, on a 85-mm-by-85-mm die package, with eight differential signal pairs per slot or row, only twelve board connectors 10, 10A, 10B, 10C and only twelve panel I/O connectors are needed on the panel to pass a minimum of three-hundred and eighty-four differential signals through the panel. If twelve more board connectors are positioned on a second die substrate surface of the die package, the total number of differential signal pairs can be doubled to 768 differential signal pairs that pass through less than a 1 RU panel area.

Any 1 RU panel area described herein is not limited to a single 1 RU panel. A 1 RU panel area can be distributed among two or more 1 RU panels. The 1 RU panel can define a plurality of panel through holes, like a screen, to permit airflow through the 1 RU panel.

Figure 33:
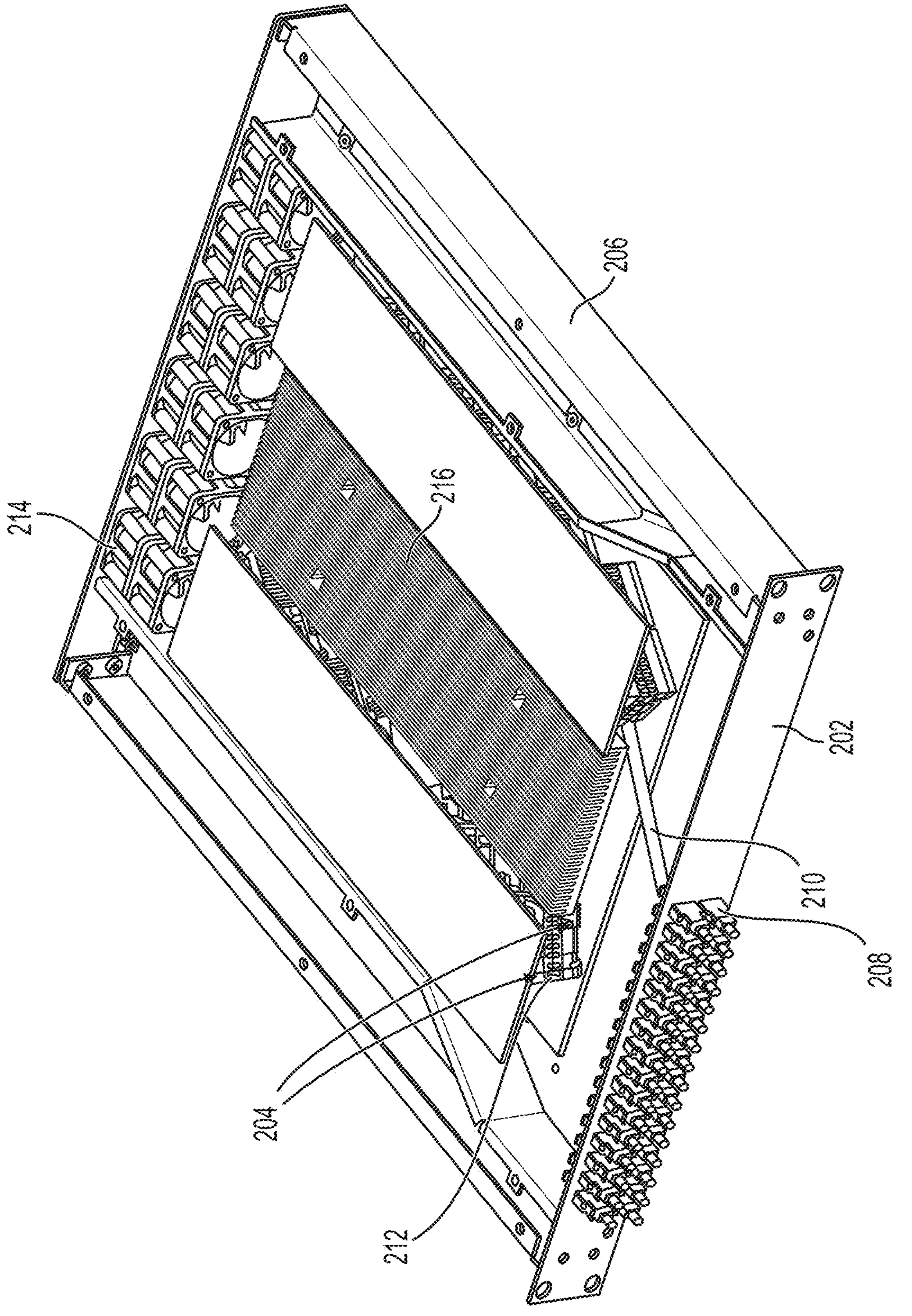
FIG. 33 is a perspective top view of a tray.
Figure 34:
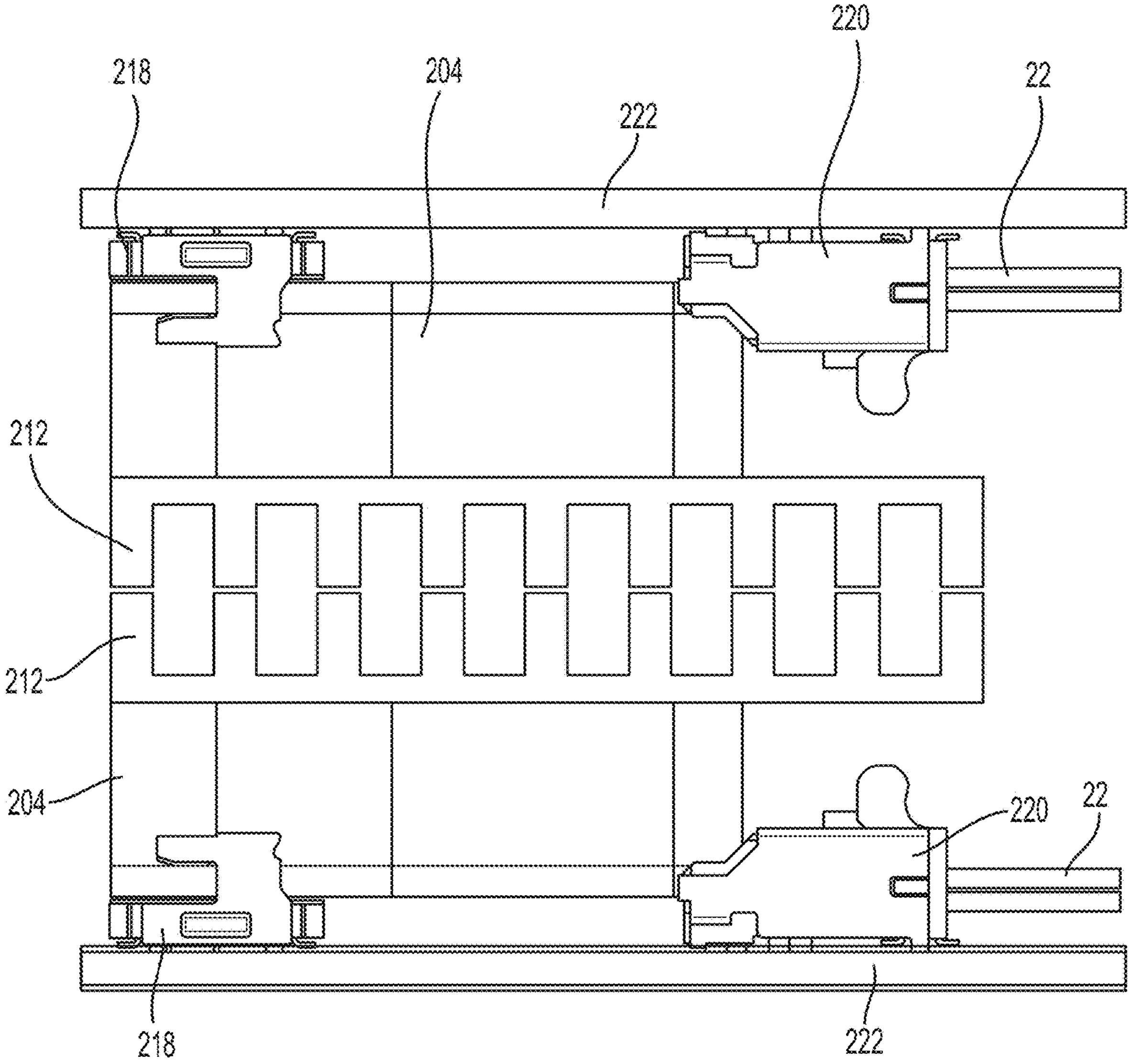
FIG. 34 is a side view of two stacked on-board transceivers.

As shown in FIG. 33, for a 1 RU panel optical solution, on-board transceivers 204, such as the FIREFLY on-board transceivers produced commercially by SAMTEC, Inc., can be carried by a tray 206. Optical front panel connectors 208 can easily fit within 50% to 60% of a 1.75-inch-by-17-inch area of a 1 RU panel 202. Optical front panel connectors 208, such as MPO, LC, or SC connectors that are compatible with both multimode optical fiber and signal-mode optical fiber or with high-density optical connectors having optical fibers, each with a 250 μm pitch or smaller, can be optically connected to on-board transceivers 204 by a respective optical cable 210. At least one on-board heat sink 212 can be positioned between two back-to-back on-board transceivers 204. Cooling fans 214 can move air over the on-board transceivers 204 and can move air over the on-board heat sinks 212. A die package and its corresponding die package heat sink 216 can be positioned between two linear arrays of on-board transceivers 204.

With reference to 34, on-board transceivers 204 can be received by corresponding low speed connectors 218 and high-speed connectors 220 that are each positioned on corresponding tray substrates 222. This configuration can yield thirty-two on-board transceivers 204, sixteen of which are not inverted and sixteen of which are inverted. Cables 22 are electrically attached to respective ones of the high-speed connectors 220 at one end, and corresponding cable connector 14 (FIG. 3) at an opposed, second end. Two on-board heat sinks 212 are shown.

Figure 35:
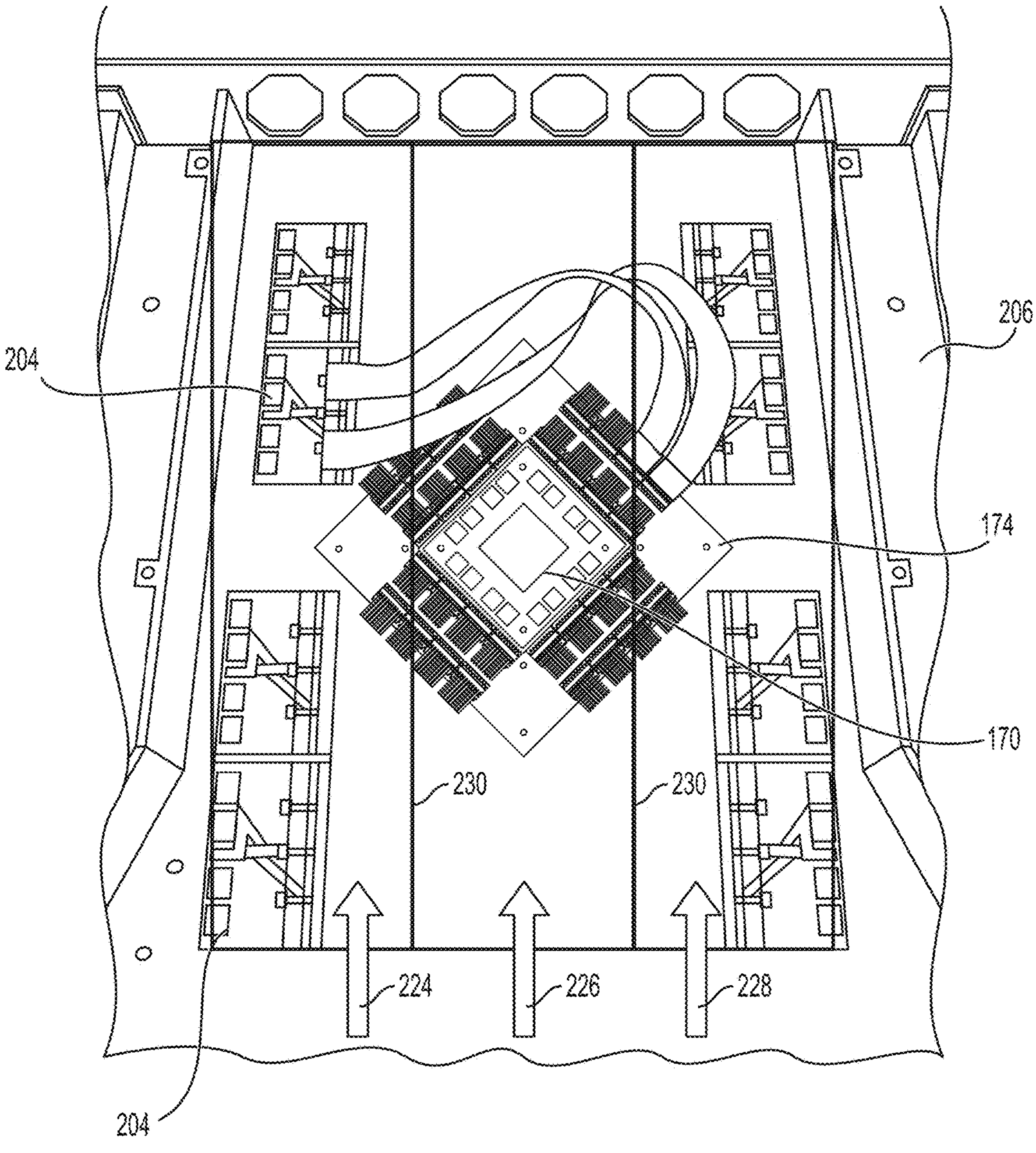
FIG. 35 is a perspective top view of the tray shown in FIG. 33 with components removed for clarity.

As shown in FIG. 35, first, second, and third airflow channels 224, 226, 228 can be segregated in a tray 206 such that on-board transceivers 204 have discrete, dedicated first and third airflow channels 224, 228, and the die 170, die package 174, and die package heat sink (e.g., die package heat sink 216 in FIG. 33) also have a dedicated second airflow channel 226. Airflow channels 224, 226, 228 can be made by physical partitions 230 or dedicated cooling fans, heat pipes, etc. The die package 174 shown in FIG. 35 is similar to the die package 174 shown in FIG. 28. Separating or segregating first, second, and third airflow channels 224, 226, 228 helps to prevent heat spread from the die 170 and its associated heat sink to the on-board transceivers 204, and from the on-board transceivers 204 to the die 170 and its associated die package heat sink. The first, second and third airflow channels 224, 226, 228 may be parallel to each other, may be positioned immediately adjacent to each other, and may be serviced by separate fans (e.g., cooling fans 214 in FIG. 33). Back-to-back on-board transceivers 204 may be positioned in the first and third airflow channels 224, 228. A die 170 and its associated die package heat sink may be positioned in the second airflow channel 226.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims. Descriptions of embodiments described herein are not limited to the embodiment described, and can also apply to other embodiments disclosed herein.

What is claimed is:

1. A board connector comprising:

a housing that includes:

a first board connector mating interface surface;

a first slot defined by the first board connector mating interface surface;

a second slot vertically stacked over the first slot; and a first housing wall that partially defines both the first slot and the second slot;

a first leadframe assembly positioned in the first slot, the first leadframe assembly including a first signal conductor with a first mating end and a second signal conductor with a second mating end;

a second leadframe assembly positioned in the second slot, the second leadframe assembly including a third signal conductor with a third mating end and a fourth signal conductor with a fourth mating end; and a board connector shield located adjacent to or molded with at least one of the first leadframe assembly and the second leadframe assembly; wherein the first mating end and the second mating end are positioned closer to the first board connector mating interface surface than the third mating end and the fourth mating end;

the first housing wall extends over the first mating end, the second mating end, the third mating end, and the fourth mating end;

the first slot and the second slot each receive a cable connector; and the board connector is configured not to receive an edge card.

2. The board connector of claim 1, wherein the first slot is partially defined by the first housing wall, a first wall, and an opposed third wall, and the first wall and the opposed third wall are evenly spaced from a longitudinal centerline that is positioned between the first wall and the opposed third wall and that is parallel to both the first wall and the opposed third wall.

3. The board connector of claim 2, wherein the second slot is partially defined by the first housing wall, the first wall, and the opposed third wall, and the first wall and the opposed third wall are unevenly spaced from the longitudinal centerline.

4. The board connector of claim 2, wherein the second slot is partially defined by the first housing wall, the first wall, and the opposed third wall, and the first wall and the opposed third wall are evenly spaced from the longitudinal centerline.

5. The board connector of claim 1, wherein the housing further includes:

a third slot vertically stacked over the second slot, a second housing wall that partially defines both the second slot and the third slot, and a third leadframe assembly positioned in the third slot, the third leadframe assembly including a fifth signal conductor with a fifth mating end and a sixth signal conductor with a sixth mating end, wherein the fifth mating end and the sixth mating end are each positioned farther from the first board connector mating interface surface than the first mating end, the second mating end, the third mating end, and the fourth mating end.

6. The board connector of claim 5, wherein the third slot is partially defined by the second housing wall, a first wall, and an opposed third wall, and the first wall and the opposed third wall are unevenly spaced from a longitudinal centerline.

7. The board connector of claim 5, wherein the second slot is partially defined by the second housing wall, a first wall, and an opposed third wall, and the first wall and the opposed third wall are evenly spaced from a longitudinal centerline.

8. The board connector of claim 5, wherein the housing further includes:

a fourth slot vertically stacked over the third slot, a third housing wall that partially defines both the third slot and the fourth slot, and a fourth leadframe assembly positioned in the fourth slot, the fourth leadframe assembly including a seventh signal conductor with a seventh mating end and an eighth signal conductor with an eighth mating end, wherein the seventh mating end and the eighth mating end are each positioned farther from the first board connector mating interface surface than the first mating end, the second mating end, the third mating end, the fourth mating end, the fifth mating end, and the sixth mating end.

9. The board connector of claim 8, wherein the fourth slot is partially defined by the third housing wall, a first wall, and an opposed third wall, and the first wall and the opposed third wall are unevenly spaced from a longitudinal centerline.

10. The board connector of claim 8, wherein the fourth slot is partially defined by the third housing wall, a first wall, and an opposed third wall, and the first wall and the opposed third wall are evenly spaced from a longitudinal centerline.

11. The board connector of claim 1, wherein the first slot and the second slot each have a same width.

12. The board connector of claim 1, wherein the first slot and the second slot each have a same depth.

13. The board connector of claim 1, wherein the first slot and the second slot each have different depths.

14. The board connector of claim 1, wherein the first slot and the second slot each receive an identical cable connector.

15. The board connector of claim 1, wherein the first, second, third, and fourth signal conductors are each receptacle conductors.

16. The board connector of claim 1, wherein the housing is configured to overhang an edge of a mounting substrate.

17. The board connector of claim 1, wherein the housing has a height of approximately 1.7 mm to approximately 4 mm.

18. The board connector of claim 1, wherein the housing has a height of approximately 4 mm to approximately 7 mm.

19. The board connector of claim 1, wherein the first slot, the second slot, and the third slot each have a same width.

20. The board connector of claim 8, wherein the housing has a height of approximately 5 mm to approximately 8 mm.

21. The board connector of claim 1, wherein:

each of the first and the second signal conductors includes a first signal section and a second signal section; and the first signal section and the second signal section define a right angle.

22. The board connector of claim 1, wherein the board connector shield is configured to electrically, physically, or electrically and physically connect to a corresponding cable connector shield of the cable connector.

23. The board connector of claim 1, wherein the first board connector mating interface surface is perpendicular or substantially perpendicular to a mounting interface surface of the housing.

24. The board connector of claim 1, wherein the first slot and the second slot simultaneously receive the cable connector.

* * * * *